(12) United States Patent
Takahata et al.

(10) Patent No.: US 8,892,517 B2
(45) Date of Patent: Nov. 18, 2014

(54) DATA UPDATING SYSTEM, NAVIGATION DEVICE, SERVER, AND METHOD OF DATA UPDATING

(75) Inventors: Seiji Takahata, Okazaki (JP); Kimiyoshi Sawai, Okazaki (JP); Tomoki Kodan, Toyota (JP); Hironobu Sugimoto, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 576 days.

(21) Appl. No.: 12/227,492

(22) PCT Filed: Jun. 8, 2007

(86) PCT No.: PCT/JP2007/061626
§ 371 (c)(1),
(2), (4) Date: Feb. 23, 2009

(87) PCT Pub. No.: WO2007/142326
PCT Pub. Date: Dec. 13, 2007

(65) Prior Publication Data
US 2009/0177706 A1    Jul. 9, 2009

(30) Foreign Application Priority Data

Jun. 9, 2006 (JP) ................................ 2006-161603
Sep. 29, 2006 (JP) ................................ 2006-269310

(51) Int. Cl.
G06F 17/30        (2006.01)
G08G 1/0969       (2006.01)
G01C 21/32        (2006.01)

(52) U.S. Cl.
CPC ............. *G08G 1/0969* (2013.01); *G01C 21/32* (2013.01)
USPC .......................................... 707/625; 707/809

(58) Field of Classification Search
CPC .................................................. G08G 1/0969
USPC ............... 707/999.2, E17.005, 821, 621, 625, 707/634, 809; 701/32.3, 32.4, 412
See application file for complete search history.

(56) References Cited

U.S. PATENT DOCUMENTS 3,704,363 A  *  11/1972  Salmassy et al. ............. 714/704
4,527,155 A       7/1985  Yamaki et al.
(Continued)

FOREIGN PATENT DOCUMENTS

AU             755096 B2      12/2002
DE          100 28 130 A1     12/2001
(Continued)

OTHER PUBLICATIONS

Japanese Office Action, Partial Translation of Final Notification of Reason(s) for Refusal mailed Nov. 12, 2009 in Japanese Patent Application No. 2006-161603.

(Continued)

*Primary Examiner* — Shiow-Jy Fan
(74) *Attorney, Agent, or Firm* — Oliff PLC

(57) ABSTRACT

A data updating system includes a navigation device running according to a predefined application program; and a server providing the navigation device with a differential data file for updating a database containing road network data. The navigation device includes a navigation memory storing a local database in an updating data format in which the road network data is arranged in the order of data types and to be updated with the differential data file; and a navigation controller that converts data stored in the local database so as to have the reference data format in which the road network data is arranged in the order of connection of the road network to be referenced to by the application program. The server includes a server controller that outputs the differential data file to be provided to the navigation device.

16 Claims, 13 Drawing Sheets

(56) References Cited

U.S. PATENT DOCUMENTS

| | | | |
|---|---|---|---|
| 5,123,085 A | 6/1992 | Wells et al. | |
| 5,280,577 A | 1/1994 | Trevett et al. | |
| 5,469,514 A | 11/1995 | Kawamura | |
| 5,559,938 A | 9/1996 | Van Roekel et al. | |
| 5,584,018 A * | 12/1996 | Kamiyama | 711/165 |
| 5,724,072 A | 3/1998 | Freeman et al. | |
| 5,790,714 A | 8/1998 | McNeil et al. | |
| 6,128,573 A | 10/2000 | Nomura | |
| 6,230,098 B1 * | 5/2001 | Ando et al. | 701/208 |
| 6,281,808 B1 | 8/2001 | Glier et al. | |
| 6,356,836 B1 | 3/2002 | Adolph | |
| 6,396,417 B2 | 5/2002 | Lee | |
| 6,453,233 B1 | 9/2002 | Kato | |
| 6,516,262 B2 | 2/2003 | Takenaga et al. | |
| 6,516,273 B1 | 2/2003 | Pierowicz et al. | |
| 6,546,334 B1 | 4/2003 | Fukuchi et al. | |
| 6,556,917 B1 | 4/2003 | Wawra et al. | |
| 6,560,529 B1 | 5/2003 | Janssen | |
| 6,615,130 B2 | 9/2003 | Myr | |
| 6,724,320 B2 | 4/2004 | Basson et al. | |
| 6,728,623 B2 | 4/2004 | Takenaga et al. | |
| 6,766,248 B2 * | 7/2004 | Miyahara | 701/208 |
| 6,803,913 B1 | 10/2004 | Fushiki et al. | |
| 6,925,378 B2 | 8/2005 | Tzamaloukas | |
| 6,927,774 B2 | 8/2005 | Yano | |
| 6,972,675 B2 | 12/2005 | Mills et al. | |
| 6,989,766 B2 | 1/2006 | Mese et al. | |
| 7,133,661 B2 | 11/2006 | Hatae et al. | |
| 7,194,347 B2 | 3/2007 | Harumoto et al. | |
| 7,254,482 B2 | 8/2007 | Kawasaki et al. | |
| 7,304,653 B2 | 12/2007 | Ueno | |
| 7,466,227 B2 | 12/2008 | Chen et al. | |
| 2001/0034575 A1 | 10/2001 | Takenaga et al. | |
| 2002/0082773 A1 | 6/2002 | Ikeuchi et al. | |
| 2002/0115423 A1 | 8/2002 | Hatae et al. | |
| 2003/0220735 A1 | 11/2003 | Nimura | |
| 2004/0130552 A1 | 7/2004 | Duluk et al. | |
| 2004/0133343 A1 * | 7/2004 | Hashida et al. | 701/208 |
| 2004/0143381 A1 | 7/2004 | Regensburger | |
| 2004/0193370 A1 * | 9/2004 | Umezu et al. | 701/210 |
| 2004/0220957 A1 * | 11/2004 | McDonough | 707/102 |
| 2005/0243104 A1 | 11/2005 | Kinghorn | |
| 2006/0114125 A1 | 6/2006 | Kubota et al. | |
| 2006/0190166 A1 * | 8/2006 | Ohira et al. | 701/208 |
| 2008/0231469 A1 | 9/2008 | Knoll et al. | |

FOREIGN PATENT DOCUMENTS

| | | |
|---|---|---|
| EP | 0 738 946 A1 | 10/1996 |
| EP | 0 782 118 A1 | 7/1997 |
| EP | 0 921 509 A2 | 6/1999 |
| EP | 1 127 727 A2 | 8/2001 |
| EP | 1 473 543 A2 | 11/2004 |
| JP | A-62-501650 | 7/1987 |
| JP | A-62-187884 | 8/1987 |
| JP | A-04-144479 | 5/1992 |
| JP | A-05-094574 | 4/1993 |
| JP | A-06-127318 | 5/1994 |
| JP | A-08-194432 | 7/1996 |
| JP | A-10-027294 | 1/1998 |
| JP | A 10-187033 | 7/1998 |
| JP | A-11-065435 | 3/1999 |
| JP | A-11-95657 | 9/1999 |
| JP | A-11-306498 | 11/1999 |
| JP | A-2000-026894 | 1/2000 |
| JP | A-2000-029450 | 1/2000 |
| JP | A 2001-75967 | 3/2001 |
| JP | A-2001-202544 | 7/2001 |
| JP | A-2001-236600 | 8/2001 |
| JP | A-2002-286459 | 10/2002 |
| JP | A-2002-318532 | 10/2002 |
| JP | A-2003-036500 | 2/2003 |
| JP | A-2003-078654 | 3/2003 |
| JP | A 2003-256257 | 9/2003 |
| JP | A-2003-279363 | 10/2003 |
| JP | A 2004-4240 | 1/2004 |
| JP | A-2004-051006 | 2/2004 |
| JP | A-2004-069549 | 3/2004 |
| JP | A-2004-125500 | 4/2004 |
| JP | A-2004-171289 | 6/2004 |
| JP | A-2004-178248 | 6/2004 |
| JP | A 2004-362287 | 12/2004 |
| JP | A-2005-165639 | 6/2005 |
| JP | A-2006-038558 | 2/2006 |
| JP | A 2006-84257 | 3/2006 |
| JP | A-2006-098094 | 4/2006 |
| JP | A-2006-189326 | 7/2006 |
| JP | A-2006-220524 | 8/2006 |
| JP | A-2006-275690 | 10/2006 |
| JP | A-2006-330908 | 12/2006 |
| JP | A-2007-041916 | 2/2007 |
| JP | A-2007-041961 | 2/2007 |
| JP | A-2007-131169 | 5/2007 |
| JP | A-2007-316025 | 12/2007 |
| WO | WO 86/02764 | 5/1986 |
| WO | WO 2005/044619 A1 | 5/2005 |
| WO | WO 2006/080547 A1 | 8/2006 |

OTHER PUBLICATIONS

Jul. 17, 2007 International Search Report issued in International Application No. PCT/JP2007/061626.
Jan. 28, 2009 Rejection issued in U.S. Appl. No. 11/397,601.
Dec. 11, 2009 Rejection issued in U.S. Appl. No. 11/397,601.
Aug. 20, 2009 Office Action (Decision of Rejection) issued in Japanese Patent Application No. 2005-111272.
Aug. 6, 2009 Notification of Reasons for Rejection issued in Patent Application No. 2006-161603.
Aug. 20, 2009 Notification of Reasons for Rejection issued in Patent Application No. 2007-091047.
Aug. 20, 2009 Notification of Reasons for Rejection issued in Patent Application No. 2007-171894.
Sep. 1, 2009 Notification of Reasons for Rejection issued in Patent Application No. 2007-255569.
Jul. 9, 2009 Final Rejection issued in U.S. Appl. No. 11/397,601.
Sep. 3, 2008 Rejection issued in U.S. Appl. No. 11/397,601.
Jun. 23, 2009 European Search Report issued in Application No. EP 08 00 4826.
Apr. 29, 2009 Rejection issued in U.S. Appl. No. 12/155,642.
Oct. 21, 2009 Notice of Allowance issued in U.S. Appl. No. 12/155,642.
Oct. 16, 2007 Rejection issued in U.S. Appl. No. 11/176,212.
Mar. 7, 2008 Notice of Allowance issued in U.S. Appl. No. 11/176,212.
Kambic S. F.; "Rotated Matrix Characters/Graphics System" Apr. 1980, IBM Technical Disclosure Bulletin, IBM Corporation, New York, pp. 4988-4990.
Fernyhough, J. et al., "Building Qualitative Event Models Automatically from Visual Input", Proceedings of IEEE 6th International Conference on Computer Vision, Jan. 4-7, 1998, Bombay, India, pp. 350-355.
Office Action issued dated Sep. 8, 2011 for corresponding Japanese Application No. 2006-269310. (with partial English language translation).
May 4, 2011 Canadian Office Action issued in Application No. 2,652,503.
Office Action issued on Feb. 23, 2010 in counterpart Japanese Application No. 2006-161603. (with English language translation).
An Office Action issued on Jul. 31, 2011 in corresponding Korean Application No. 10-2008-7028844. (with English language translation).
Feb. 24, 2012 extended European Search Report issued in Application No. 07744946.0.

* cited by examiner

| RECORD MARK | | PERMANENT ID |
|---|---|---|
| ROAD DATA | A1 | 000011 |
| | A2 | 000102 |
| | ⋮ | ⋮ |
| INTER-SECTION DATA | A1 | 013050 |
| | A2 | 040011 |
| | ⋮ | ⋮ |

F I G. 15
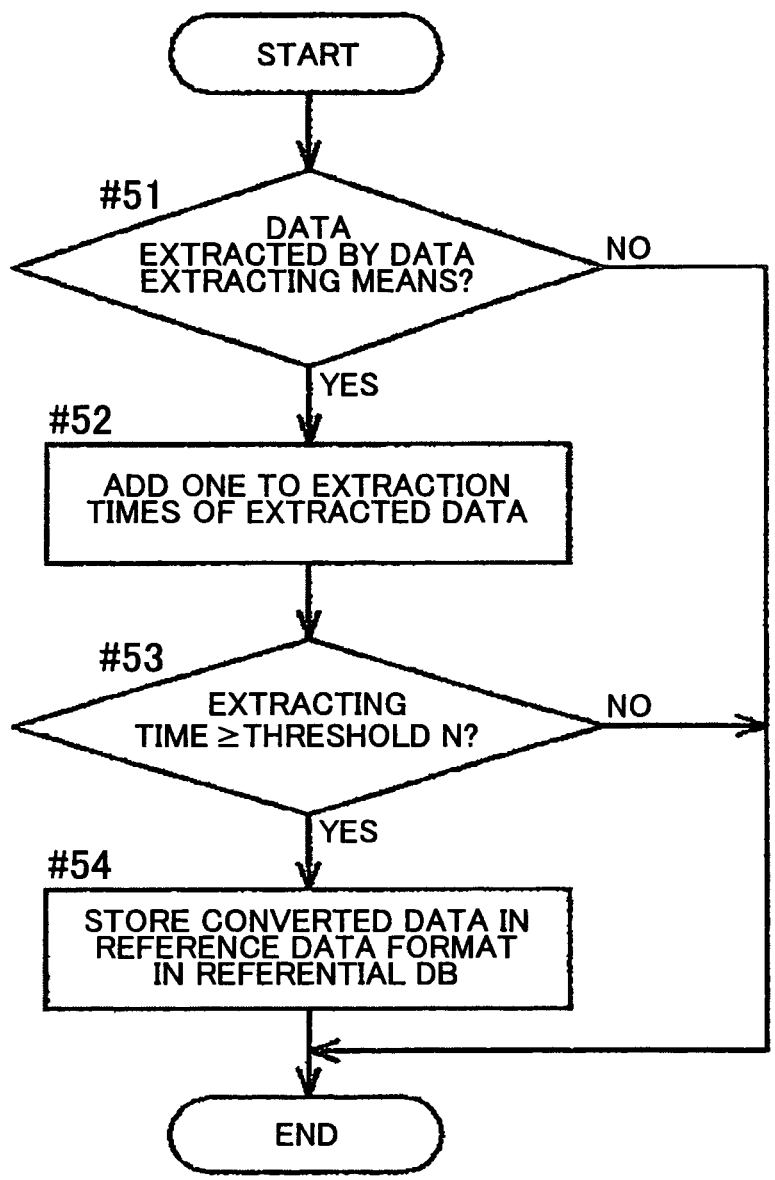

DATA UPDATING SYSTEM, NAVIGATION DEVICE, SERVER, AND METHOD OF DATA UPDATING

INCORPORATION BY REFERENCE

This application is the U.S. National Phase of PCT/JP2007/061626, filed Jun. 8, 2007, which claims priority from Japanese Patent Application No. 2006-161603, filed Jun. 9, 2006, and Japanese Patent Application No. 2006-269310, filed Sep. 29, 2006. The disclosures of each of the prior applications, including the specifications, drawings, and abstracts are incorporated herein by reference in their entirety.

BACKGROUND

The present invention relates to a data updating system, navigation apparatus, server apparatus, and data updating method.

There exists data updating systems in which differential data is transmitted from a server to a terminal device, for example, a navigation device and terminal device that receives the differential data updates data using existing information already in its possession and the differential data. For example, the data updating system described in Japanese Patent Application Publication No. JP-A-2006-084257 is an information delivery system having a server that provides information and a terminal device that receives information from the server. The server has a differential information extracting section that extracts the difference between the information previously sent to the terminal device and the information to be transmitted, and a transmitting section which transmits the differential information extracted by the differential information extracting section to the terminal device. The terminal device has a receiving section that receives the differential information transmitted from the center equipment and a display section that displays the differential information received by the receiving section combined with the existing information.

In the case of traffic information, such as traffic jams and traffic controls, the differential information is the information which represents the difference between the previously produced traffic information and the latest traffic information. The terminal device which receives such differential information displays the newly received differential information combined with the existing traffic information that has been received and stored in its storing section. This configuration makes it possible to frequently update the traffic information to be displayed on the terminal device and to minimize the amount of data that is transmitted from the center equipment to the terminal device for updating.

SUMMARY

The aforementioned data updating system is a system which updates data containing a relatively small amount of information, such as traffic information. As a result, when the server creates and transmits the differential data to the terminal device, it is relatively easy to update the data on the terminal device, for example, by renewing the existing data with the differential data.

However, when updating a database that contains a large amount of highly correlated data, such as a map database that contains road network data used for a navigation device, it is difficult to update the database using the differential data received. In such a complex data system, as the amount of data required to be changed in connection with changing a single piece of data increases, the amount of the differential data also increases. Furthermore, in order to update a database based on differential data, the data to be updated, which corresponds to a large amount of the differential data, must first be extracted from a database of a large amount of data. Thus, using the above-described system to update a database that contains road network data is complicated and time consuming. Therefore, the general practice of updating a complex database, such as a map database, includes renewing all the data, not just updating the differences. Such a method, however, makes it difficult to transmit the update data to the terminal device via a communication network or the like because the amount of data required for updating is huge. As a result, frequent and timely updates are difficult.

Various exemplary implementations of the broad principles described herein provide a data updating system, a terminal device and a server used for the data updating system, and a method of data updating to easily perform updating the difference for the database which contains a large amount of data, each piece of the data being highly correlated, such as a map database that contains road network data.

Exemplary implementations of the inventive principles herein provide a data updating system that includes a navigation device running according to a predefined application program; and a server providing the navigation device with a differential data file for updating a database containing road network data. The navigation device includes a navigation memory storing a local database in an updating data format in which the road network data is arranged in the order of data types and to be updated with the differential data file; and a navigation controller that converts data stored in the local database so as to have the reference data format in which the road network data is arranged in the order of connection of the road network to be referenced to by the application program. The server includes a server controller that outputs the differential data file to be provided to the navigation device.

Exemplary implementations of the inventive principles herein provide a navigation device receiving a differential data file for updating a database containing road network data from a server and running according to a predefined application program. The navigation device includes a navigation memory storing a local database in an updating data format in which the road network data is arranged in order of data types and to be updated with the differential data file; and a navigation controller that converts data stored in the local database so as to have the reference data format in which the road network data is arranged in the order of connection of the road network to be referenced to by the application program.

Exemplary implementations of the inventive principles herein provide a server providing a navigation device with a differential data file for updating a database containing road network data. The server includes a server memory storing a comparison local database having the same content as a local database included in the navigation device; and a server controller that receives a new data entry; generates, based on the comparison local database and the new data, the differential data file containing data representing an updating status and road network data for a portion to be updated in a data format in which the road network data for the portion to be updated is arranged in the order of data types; and outputs the differential data file to be provided to the navigation device.

Exemplary implementations of the inventive principles herein provide a method for updating data, the method using a server and a navigation device that includes a navigation memory storing a local database in an updating data format in which road network data is arranged in the order of data types, and a referential database storing data in a reference data format to be referenced to by a predefined application program, and running according to the application program, and the method providing a differential data file for updating a database containing the road network data from the server to the navigation device. The method includes outputting the differential data file to be provided to the navigation device from the server, receiving the differential data file in the navigation device, updating the local database with the differential data file in the navigation device, converting data in the local database after updated so as to have the reference data format in which the road network data is arranged in the order of connection of the road network in the navigation device, and updating the referential database with the data after converted in the navigation device.

Exemplary implementations of the inventive principles herein provide a data updating system that includes a navigation device running according to a predefined application program; and a server providing the navigation device with a differential data file for updating a database containing road network data. The navigation device includes a navigation memory storing a local database in an updating data format in which the road network data is arranged in the order of data types and being updated with the differential data file; and a navigation controller that: extracts necessary data from the local database in accordance with the request of the application program; and converts extracted data to the reference data format in which the road network data is arranged in the order of connection of the road network to be referenced to by the application program. The server includes a server controller that outputs the differential data file to be provided to the navigation device.

Exemplary implementations of the inventive principles herein provide a navigation device receiving a differential data file for updating a database containing road network data from a server and running according to a predefined application program. The navigation device includes a navigation memory storing a local database in an updating data format in which the road network data is arranged in the order of data types and is updated with the differential data file; and a navigation controller that extracts necessary data from the local database in accordance with the request of the application program; and converts extracted data to the reference data format in which the road network data is arranged in the order of connection of the road network to be referenced to by the application program.

Exemplary implementations of the inventive principles herein provide a method for updating data, the method using a server and a navigation device including a navigation memory storing a local database in an updating data format in which road network data is arranged in the order of data types, and a referential database storing data in a reference data format to be referenced to by a predefined application program, and running according to the application program, and the method providing a differential data file for updating a database containing the road network data from the server to the navigation device. The method includes outputting the differential data file to be provided to the navigation device from the server, receiving the differential data file in the navigation device, updating the local database with the differential data file in the navigation device, extracting necessary data from the local database in accordance with the request of the application program in the navigation device, and converting extracted data so as to have the reference data format in which the road network data is arranged in the order of connection of the road network to be referable by the application program after converted in the navigation device.

BRIEF DESCRIPTION OF THE DRAWINGS

Exemplary implementations will now be described with reference to the accompanying drawings, wherein:

FIG. 15 is a flowchart of extracting frequency judging and storing data in an exemplary referential database.

DETAILED DESCRIPTION OF EMBODIMENTS

Figure 1:
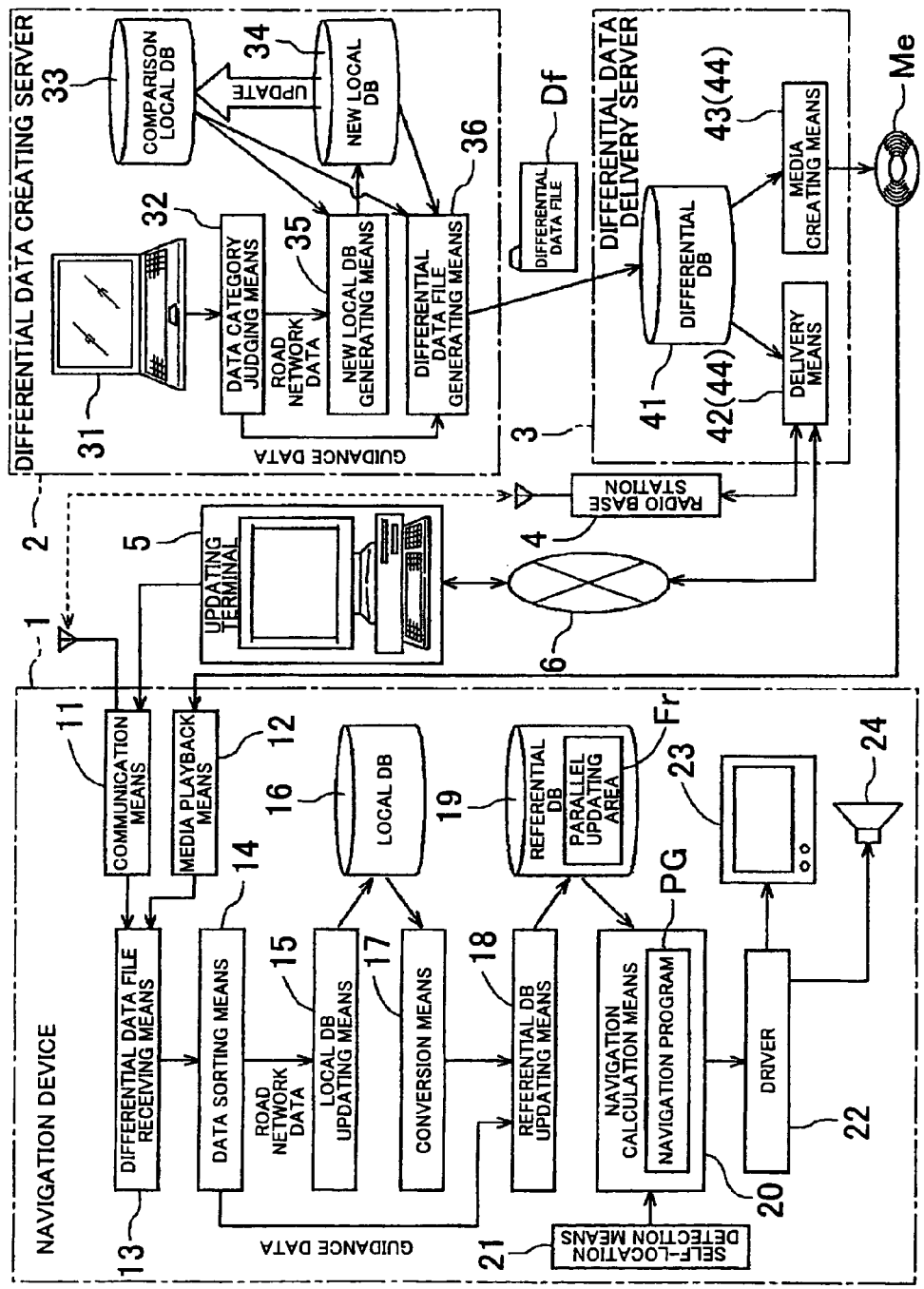
FIG. 1 is a block diagram illustrating an exemplary configuration of a data updating system.

An exemplary data updating system will be described in detail. FIG. 1 is a block diagram schematically illustrating the overall configuration of a data updating system. A terminal device is a navigation device 1. This data updating system is a system that provides a differential data file Df created by a differential data creating server 2 to the navigation device 1 via a differential data delivery server 3, and updates a referential database 19 as a map database for navigation. For this purpose, the data updating system has, as its main components, the navigation device 1, the differential data creating server 2, and the differential data delivery server 3. The differential data creating server 2 and the differential data delivery server 3 are the servers.

Each means included in the navigation device 1, the differential data creating server 2, and the differential data delivery server 3 is composed of function sections that perform various processes corresponding to the data entered and are implemented by hardware, software (program), or a combination of the both, with a CPU and an arithmetic processing unit as a core component. Each database provided in the navigation device 1, the differential data creating server 2, and the differential data delivery server 3 is hardware configured with a device which has a rewritable storage medium and a driving means, such as a hard disk drive and a flash memory. In the drawings of this application, the word "database" is abbreviated as "DB" for simplification. The configuration of each device will now be described. For discussion purposes, the term "means" will be used; however, as should be appreciated, the terms "means," "device," apparatus," etc., should be considered synonyms.

In order to implement basic functions such as display of self-location, route calculation from a starting point to a destination, route guidance, and destination search, the navigation device 1 has a navigation calculation means 20, a referential database 19, a self-location detection means 21, a driver 22, a display and operation section 23, and an audio output section 24.

Figure 2:
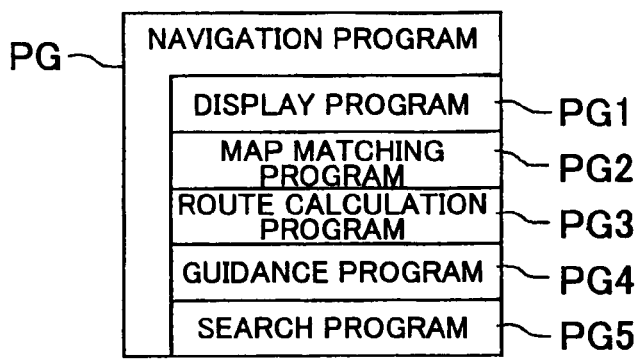
FIG. 2 is an illustration an exemplary configuration of a navigation program.

The navigation calculation means 20 is a calculation means which operates according to a navigation program PG as an application program. FIG. 2 is a schematic illustration of an exemplary configuration of a navigation program PG. As illustrated in the drawing, the navigation program PG has multiple application programs PG1 to PG5. The navigation program PG has five application programs: a display program PG1, a map matching program PG2, a route calculation program PG3, a guidance program PG4, and a search program PG5. The display program PG1 is a program that displays maps of neighboring areas of a self-location, a destination, and a position of a self-location on the aforementioned maps on a display screen of the display and operation section 23. The map matching program PG2 is a program that performs a map matching process to align the self-location detected by the self-location detection means 21 with a road on a map. The route calculation program PG3 is a program that performs route calculation of, for example, a route from a self-location to a destination and such entered by the display and operation section 23. The guidance program PG4 is a program that provides optimal route guidance to a destination according to the route determined by route calculation with display guidance on the display screen of the display and operation section 23 and voice guidance of the audio output section 24. The search program PG5 is a program that searches a destination, a point of map display, and such based on an address, a telephone number, a name of facility, a genre and the like. As the operation process of each program of the navigation device 1 is publicly known, the detailed description is omitted. Each of the application programs PG1 to PG5 uses data such as road network data Rn, and guidance data Gd stored in the referential database 19.

Figure 3:
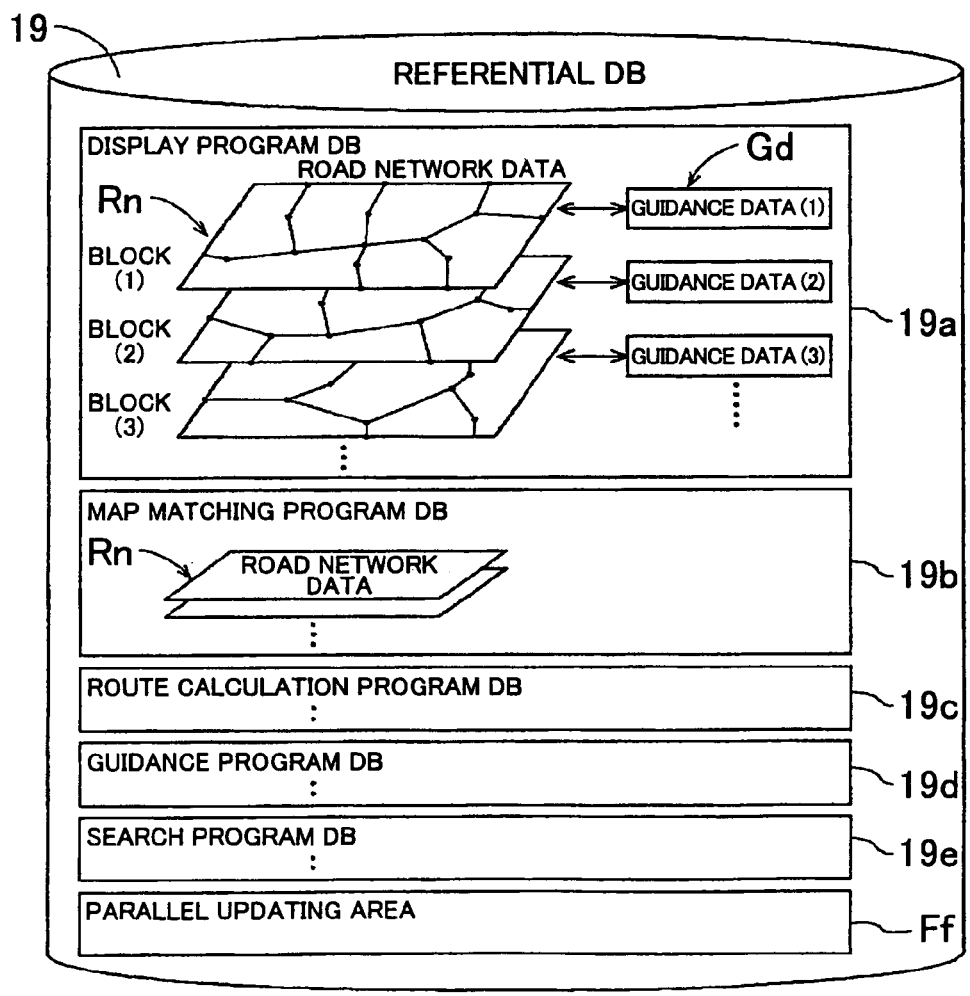
FIG. 3 is an illustration of a structural example of a referential database.

The referential database 19 is a database that stores data in a reference data format which is referenced by the navigation program PG to implement the basic functions of the navigation device 1 described above. The referential database 19 functions as a map database for navigation that includes the road network data Rn and the guidance data Gd. The referential database 19 also has databases for multiple application programs corresponding to each of the application programs for multiple functions of which the navigation program PG is composed. FIG. 3 is an illustration of a structural example of the referential database 19. As illustrated in the drawing, each piece of the road network data Rn and the guidance data Gd and such stored in the referential database 19 is stored in accordance with each of the application programs PG1 to PG5 to form databases 19a to 19e, respectively, for the application programs ("application database"). More specifically, the referential database 19 contains a display program database 19a, a map matching program database 19b, a route calculation program database 19c, a guidance program database 19d and a search program database 19e. In addition, although omitted partly in the drawing, the application databases 19a to 19e store at least the road network data Rn in the reference data format corresponding to the application programs PG1 to PG5, respectively. Some databases, for example, the map matching program database 19b, have no guidance data Gd. Further, the referential database 19 also has a parallel updating area Fr as a parallel updating data storage means. The parallel updating area Fr is an area to store the updating data of the referential database 19 while the referential database 19 is being referenced by the application programs PG1 to PG5 of the navigation program PG. The usage of the parallel updating area Fr will be described later.

As illustrated in FIG. 3, the road network data Rn stored in each of the application databases 19a to 19e in the referential database 19 is of multiple data sorted by each predefined block (such as block 1 to block 3 in FIG. 3). For example, as an area of 2.5 km square is defined as one block, the road network data Rn of road networks of the entire area of Japan divided into multiple blocks is stored in each of the application databases 19a to 19e. The guidance data Gd is linked to the road network data Rn of each block (such as guidance data 1 to guidance data 3 in FIG. 3) and stored in each of the application databases 19a to 19e. More specifically, the guidance data Gd is the data used by each of the application programs PG1 to PG5 of the navigation program PG for display, guidance, and search; and includes image data, audio data, point of interest (POI) data, and the like. Each of these data is stored and linked to the related data of links and nodes contained in the road network data Rn (see FIG. 4).

Figure 4:
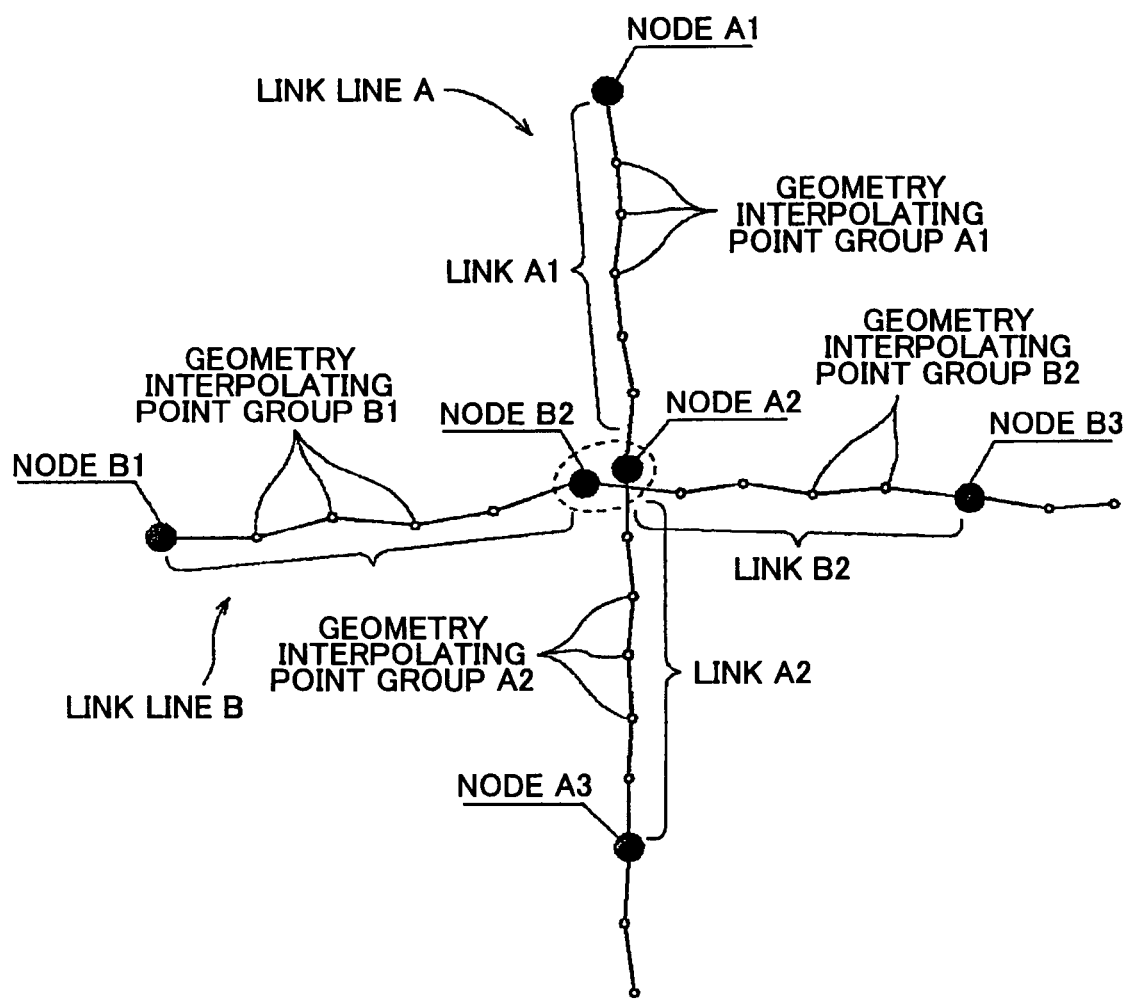
FIG. 4 is an illustration of an example of a road network.

FIG. 4 is an illustration of an example of a road network represented by the road network data Rn. In the example illustrated in the drawing, there are two link lines of link line A and link line B. The link lines A and B are respectively composed of nodes A1 to A3 and B1 to B3 (bullets in FIG. 4), links A1, A2, B1, and B2 connecting two nodes (solid lines in FIG. 4), and geometry interpolating point groups A1, A2, B1, and B2, which define the geometry of each link (open circles in FIG. 4). The road network data Rn is the data representing each configuration of these link lines. The node A2 of the link line A and the node B2 of the link line B are, although indicated in different locations in FIG. 4, of the nodes representing the same intersection. In the road network data Rn, as the data corresponding to each node is maintained by each of the link lines A and B, the data corresponding to nodes of the same intersection are provided in the link lines A and B. The data representing such a node includes the allocation of data corresponding to the other nodes representing the same intersection.

Figures 5, 6:
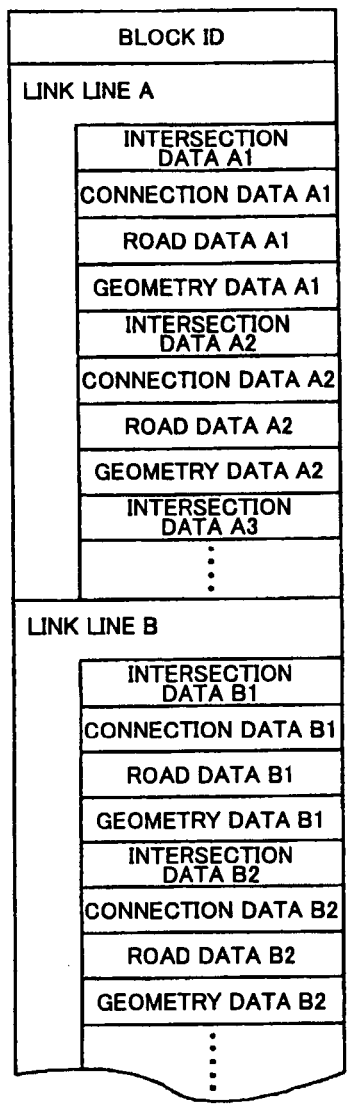
FIG. 5 is an illustration of a configuration example of road network data in a reference data format.
FIG. 6 is an illustration of an example of the comparison table of record marks and permanent IDs of each piece of the data.

FIG. 5 is an illustration of a configuration example of the road network data Rn in the reference data format representing the road network shown in FIG. 4. As illustrated in the drawing, the reference data format is a data format of each data group being arranged in the order of connection of road networks. In this example, the road network data Rn is sorted by each predefined block (such as block 1 to block 3 in FIG. 3) and block ID data indicating the corresponding block is disposed at the top of the data. The road network data Rn includes as its substantive data, intersection data, connection data, road data, and geometry data. The intersection data includes coordinate information of a node representing an intersection, attribute information of the intersection indicating the presence of traffic signals and guidance signs, layer information indicating how far the aforementioned intersection is displayed in multiple steps of map display layers, and such. The connection data includes information to which road (link) the node representing an intersection is connected, information of necessity of guidance and presence of traffic controls according to the direction of travel at the intersection, and such. The road data includes information of nodes at both ends of a link representing a road, the category and width of the road, the number of lanes, layer information indicating how far the aforementioned road is displayed in multiple steps of map display layers, and such. The geometry data includes coordinate information of a geometry interpolating point group that specifies the geometry of links representing a road. These data of intersection data, connection data, road data, and geometry data mentioned above and those of the road network data Rn in an updating data format stored in a later described local database 16, and those of the data relating to the road network data Rn in the differential data file Df represent the same kind of contents, but their specific contents, arrangements and such are different to a certain extent. For example, with the road network data Rn stored in the referential database 19, the contents of road extension data and intersection extension data of the road network data Rn in the updating data format are not separated as independent items, but correlated data pieces are included in any one of the intersection data, connection data, road data, and geometry data.

Each data group is arranged in the order of connection of road networks, more specifically, in the order of connection of nodes and links included in each link line. For example, the data representing the link line A, shown in FIG. 4, is arranged from the top in the following order: intersection data A1, connection data A1 corresponding to the node A1, road data A1 corresponding to the link A1 that connects to the node A1, and geometry data A1 corresponding to the geometry interpolating point group A1 of the link A1, intersection data A2, connection data A2 corresponding to the node A2 that connects to the other end of the link A1, road data A2 corresponding to the link A2 which connects to the node A2, and geometry data A2 corresponding to the geometry interpolating point group A2 of the link A2 (see FIG. 5). The other link lines such as the link line B, also have a similar data arrangement. The road network data Rn is, as described above, sorted by each predefined block and stored in each of the application databases 19a to 19e. Depending on in which one of the application databases 19a to 19e is stored, the specific content and such of each data group included in the road network data Rn differ. However, the data arrangement sorted in a manner illustrated in FIG. 5 is applied to all application databases 19a to 19e.

Though not indicated in FIG. 3, the referential database 19 stores a comparison table of a record mark and a permanent ID of each data group included in the road network data Rn and the guidance data Gd and such. FIG. 6 is an illustration of an example of such a comparison table. As illustrated in the drawing, the record mark of each data group included in the road network data Rn and the guidance data Gd and such are marked as A1 and A2 of road data, A1 and A2 of intersection data, and so on, as one example. The presence of the comparison table allows correspondence of the permanent ID data contained in the later described differential data file Df (see FIG. 7) to each data group included in the referential database 19. Therefore, it makes it possible to correspond the permanent ID data and substantive data linked thereto contained in the differential data file Df to each data group included in the guidance data Gd in the referential database 19, and to update the guidance data Gd in the referential database 19 based on the differential data file Df.

A self-location detection means 21 detects the current position of the navigation device 1. For this purpose, the self-location detection means 21 has, for example, a GPS receiver, a direction sensor, and a distance sensor, although omitted in the drawing. Coordinates of current position, traveling direction and other information are obtained based on the data acquired with the above-mentioned elements and are fed to a navigation calculation means 20. The display and operation section 23 is composed of a display screen of a liquid crystal display device and the like, touch panel, and operation switches and such linked to the display screen. The audio output section 24 is composed of a speaker, an amplifier and such. The display and operation section 23 and audio output section 24 are connected to the navigation calculation means 20 through the driver 22 and provide display, audio output, and the like for display of self-location, route calculation between two points, route guidance, destination search, and such according to the operation of the navigation calculation means 20. The display and operation section 23 receives the input operation of a user and feeds its content to the navigation calculation means 20 as well.

In order to implement updating functions of the referential database 19, and in addition to the configurations required to implement the basic functions described above, the navigation device 1 has the following as illustrated in FIG. 1: a communication means 11, a media playback means 12, a differential data file receiving means 13, a data sorting means 14, a local database updating means 15, a local database 16, a conversion means 17, and a referential database updating means 18. In order to update the referential database 19 with road network data Rn, the local database 16 is differentially updated based on the differential data file Df provided by the differential data delivery server 3, then the referential database 19 is updated by converting the updated data in the local database 16 to the reference data format. As to guidance data Gd of image data, audio data, point of interest (POI) data, and such, the referential database 19 is directly updated based on the differential data file Df because each piece of data is not as highly correlated. Each of these configurations will be described in details.

The differential data file receiving means 13 receives a differential data file Df provided by the differential data delivery server 3. In this example, a differential data file Df is received via the communication means 11 or the media playback means 12. The communication means 11 is configured to receive a differential data file Df in radio communications with a radio base station 4. For such wireless communication methods, publicly known communication networks, such as a mobile telephone network and a wireless local area network (LAN), can be used. The communication means 11 is configured to communicate with an updating terminal 5 of a user or a provider of the navigation device 1 and such, and receive a differential data file Df transmitted to the updating terminal 5 via a communication network 6, such as the Internet. A personal computer and such can be used as the updating terminal 5. Various publicly known wired and wireless communication methods can also be used as a communication method between the communication means 11 and the updating terminal 5. The media playback means 12 is configured to playback a recording medium produced by the differential data delivery server 3 and to read out the differential data file Df recorded therein. When receiving a differential data file Df from the differential data delivery server 3 via the communication means 11 or when reading out a differential data file Df from a recording medium by the media playback means 12, the differential data file receiving means 13 is configured to receive only the differential data files Df of later versions than that of the road network data Rn stored in the local database 16.

The differential data file Df is a compiled differential data file of the data subject to update against the content of data stored in the referential database 19 of the navigation device 1 according to the status of actual roads, facilities and such. The differential data creating server 2 creates the differential data file Df, as described later, based on the new data and the data stored in a comparison local database 33 which has the same content as that of the local database 16 of the navigation device 1.

Figure 7:
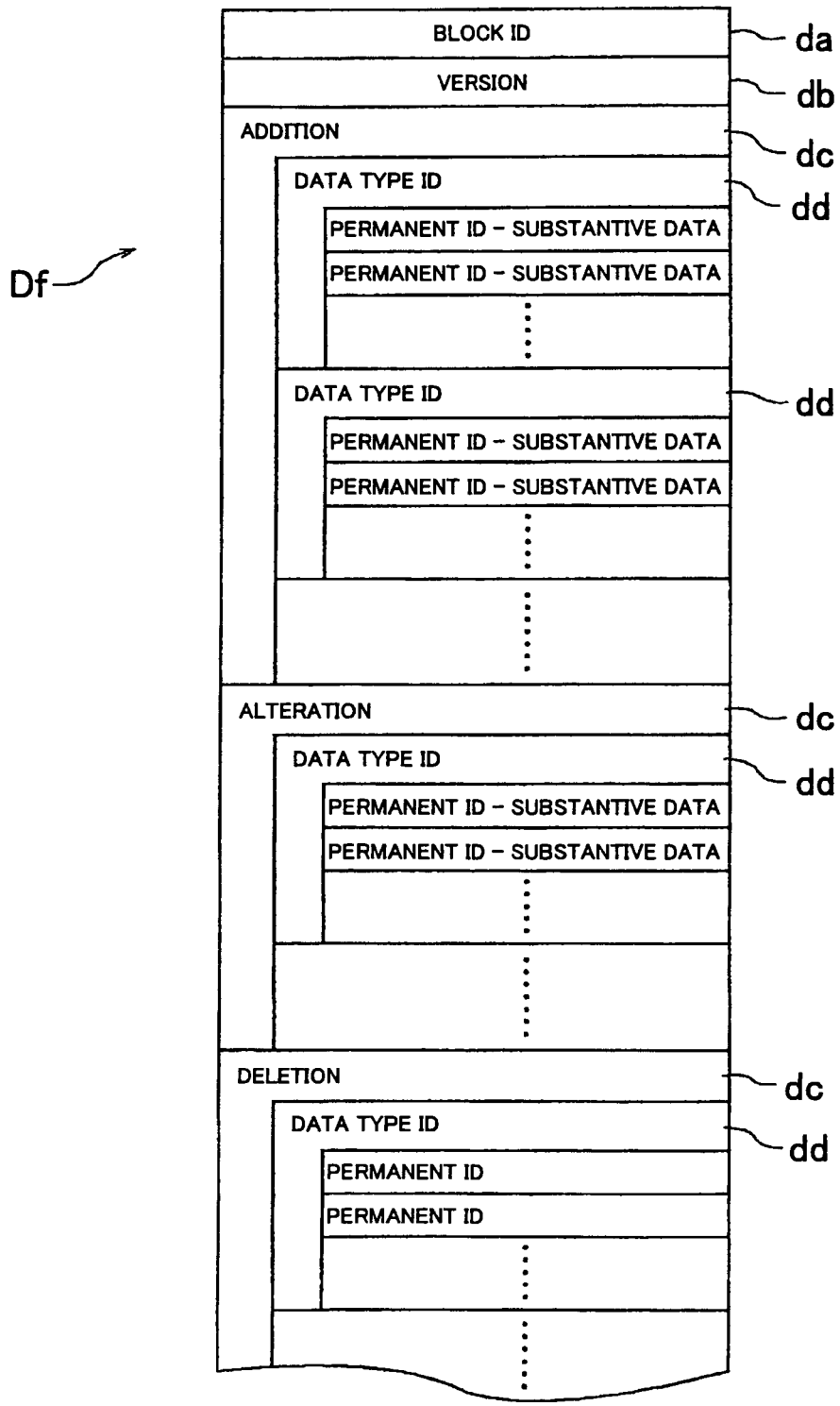
FIG. 7 is an illustration of a configuration example of a differential data file.

FIG. 7 is an illustration of a configuration example of the differential data file Df. The differential data file Df is created corresponding to the road network data Rn of each block (such as block 1 to block 3 in FIG. 3) having block ID data da indicating the corresponding block disposed at the top of the data. The differential data file Df also has version data db indicating the version of update. In the differential data file Df, the data subject to update is sorted and arranged by each update status. For this reason, update status data dc indicating the statuses of addition, modification, and deletion is disposed at the top of data groups by each update status. Further, in the differential data file Df, the data of each data group sorted by update status is arranged in the order of data categories. For this reason, data category ID data dd indicating the data category of the aforementioned data group is disposed at the top of the data group by each data category. Following the data category ID data dd, permanent ID data of each data and its linked substantive data are arranged. When data has an update status of deletion, only the permanent ID data is arranged because new substantive data is not required. The permanent ID is a unique ID of the map database specific to each substantive data included in the road network data Rn and the guidance data Gd that is used in common in both the referential database 19 and the local database 16.

The data is principally composed of the differential data file Df of various data pieces included in the road network data Rn and the guidance data Gd. More specifically, the data categories relating to network system data that is the principal data included in the road network data Rn include intersection data, connection data, road data, geometry data, and such. The additional data of the road network data Rn include, linked to these network system data, road extension data and intersection extension data. The data categories of the road extension data include road name data and traffic information related data, which links the traffic information from vehicle information and communications system ("VICS") and such to road data, and the like. The data categories of the traffic extension data include intersection name data, intersection guidance data, which indicates the permanent ID data and such of the guidance data Gd that includes the necessity of guidance at an intersection and guidance content for the intersection, and the like. The various categories of data included in the road network data Rn are sorted by the category of each element, such as intersection data, connection data, road data, geometry data, road name data, traffic information related data, intersection name data, and intersection guidance data. The data sorted by the categories of elements are arranged in the order of data categories. Although the previous description is for the differential data file Df, the same principle applies to the road network data Rn stored in the local database 16. The data categories of guidance data Gd include image data, audio data, point of interest (POI) data, and such. A data category ID is given to each data category and disposed in the differential data file Df as data category ID data dd.

Referring back to FIG. 1, the data sorting means 14 sorts data in the differential data file Df received by the differential data file receiving means 13 between the data relating to road network data Rn, other guidance data Gd, and such. As described later, the local database 16 is a database for differential updating of the road network data Rn. The data sorting means 14 feeds the data relating to road network data Rn sorted from the differential data file Df to the local database updating means 15. The data sorting means 14 also feeds the data relating to guidance data Gd and such, other than the road network data Rn, to the referential database updating means 18.

Figure 8:
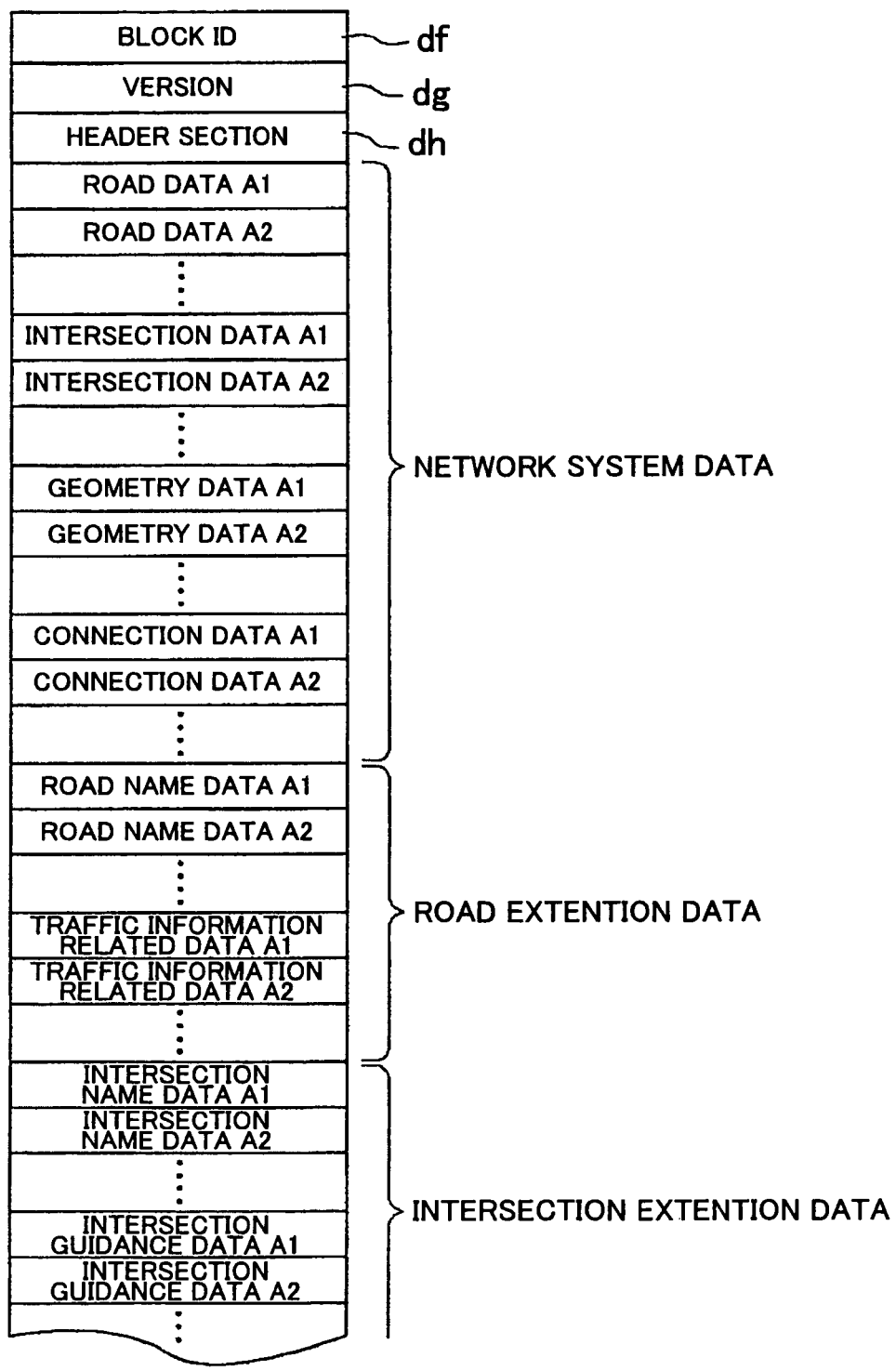
FIG. 8 is an illustration of a configuration example of road network data in an updating data format.

The local database 16 is a database for differential updating of the road network data Rn. For this purpose, the road network data Rn stored in the local database 16 is configured in the updating data format which is different from the reference data format stored in the referential database 19. FIG. 8 is an illustration of a configuration example of the road network data Rn in the updating data format. As illustrated in the drawing, the updating data format is a data format of each data group being arranged in the order of data categories. Similar to the referential database 19, the road network data Rn in the local database 16 is sorted by each predefined block (see block 1 to block 3 in FIG. 3) and block ID data df indicating the corresponding block is disposed at the top of the data. The road network data Rn has version data dg indicating the version of update. Further, the road network data Rn has a header section dh that contains address data indicating the disposition of its substantive data.

The data categories of data relating to network system data included in the road network data Rn in the updating data format stored in the local database 16, similar to the differential data file Df, include intersection data, connection data, road data, geometry data, and such. The road extension data include road name data, traffic information related data, and such. The intersection extension data include intersection name data, intersection guidance data, and such. Each data group is arranged in the order of data categories, and the data in the same category are arranged serially. More specifically, as illustrated in FIG. 8, arranged from the top are all the road data that are arranged serially as road data A1, road data A2, and so on, all the intersection data that are arranged serially as intersection data A1, intersection data A2, and so on, followed by all the data categories of the same arrangement. The header section dh contains the address data indicating the allocated area of each data category and the allocation of each data within the same data category. Therefore, the local database updating means 15 can obtain the allocation information of each data in the local database 16 by referencing to the information contained in the header section dh.

The local database 16 stores, as similar to the referential database 19, a comparison table of record marks and permanent IDs for the data included in the road network data Rn as indicated in FIG. 6. The presence of the comparison table makes it possible to correspond the permanent ID data and its linked substantive data contained in the differential data file Df to each piece of the data included in the road network data Rn in the local database 16, and to update the road network data Rn in the local database 16 based on the differential data file Df.

The local database 16 is, different from the referential database 19, not sorted by application programs and configured as a single piece of database. In the local database 16, only the data relating to road network data Rn is stored, and no data relating to guidance data Gd is stored.

The local database updating means 15 updates the content of the local database 16 based on the data relating to the road network data Rn contained in the differential data file Df which is sorted by the data sorting means 14. As described above, the road network data Rn in the differential data file Df and that of the local database 16 have block ID data da and df respectively (see FIGS. 7 and 8). The local database updating means 15, therefore, updates the road network data Rn of each block using the differential data file Df of the matched block ID data da and df. The method of updating depends on the update status of the data subject to update contained in the differential data file Df. Data may have an update status of addition, modification or deletion.

When the data has an update status of addition, the local database updating means 15 adds the aforementioned data subject to update in the area where the data of the corresponding data category is stored, and adds the information indicating the allocation of the aforementioned added data to the address data in the header section dh. It also updates the comparison table, thereby adding the record mark and the permanent ID for the aforementioned data added. When the data has an update status of modification, the local database updating means 15 obtains at first, based on the comparison table as illustrated in FIG. 6, the record mark information of the corresponding data from the permanent ID of the data subject to update contained in the differential data file Df. Then, it obtains the storage allocation information of the data subject to update referencing to the address data in the header section dh of the road network data Rn in the local database 16, and rewrites the data subject to update. When the data has an update status of deletion, the local database updating means 15 obtains at first, based on the comparison table as illustrated in FIG. 6, the record mark information of the corresponding data from the permanent ID of the data subject to update contained in the differential data file Df. Then, it obtains the storage allocation information of the data subject to update referencing to the address data in the header section dh of the road network data Rn in the local database 16. Finally, it deletes the data subject to update and its address data. It also updates the comparison table and deletes the information of the record mark and the permanent ID for the aforementioned deleted data.

The local database updating means 15 updates, when the local database 16 is updated with the differential data file Df, the version data dg of the aforementioned updated block of the road network data Rn in the local database 16 to the same version as the version data db (see FIG. 7) of the aforementioned differential data file Df.

The conversion means 17 converts the data format of the road network data Rn stored in the local database 16 from the updating data format to the reference data format. More specifically, the conversion means 17 converts the road network data Rn in the updating data format of each data group being arranged in the order of data categories as illustrated in FIG. 8, into the road network data Rn in the reference data format of each data group being arranged in the order of connection of road networks as illustrated in FIG. 5. Meanwhile, the referential database 19 is divided into multiple application databases 19a to 19e as described above, and each of the application databases 19a to 19e stores the respective road network data Rn in the reference data format corresponding to each of the application programs PG1 to PG5. The conversion means 17 is configured to create multiple kinds of road network data Rn in the reference data format corresponding to each of the application programs PG1 to PG5 by converting a single piece of road network data Rn in the updating data format stored in the local database 16. In each of the application databases 19a to 19e, the road network data Rn is sorted by each predefined block (such as block 1 to block 3 in FIG. 3). Therefore, the conversion means 17 is configured to convert from the road network data Rn of the updating data format to that of the reference data format by each predefined block.

The referential database updating means 18 updates the referential database 19. The referential database 19 is updated using the road network data Rn converted by the conversion means 17. As described above, the conversion means 17 is configured to convert the road network data Rn in the reference data format corresponding to each of the application programs PG1 to PG5 by each predefined block. The referential database updating means 18 updates by replacing the road network data Rn in the referential database 19 with the converted road network data Rn, by the unit of the road network data Rn converted by the conversion means 17, that is to say, by each predefined block of each of the application databases 19a to 19e. More specifically, for example, when the road network data Rn of block 1 in the local database 16 is converted to the reference data format corresponding to the display program PG1 by the conversion means 17, the update is done by replacing the road network data Rn of the block 1 in the display program database 19a with the thus converted road network data Rn.

The referential database updating means 18 updates the referential database 19 directly, as for the guidance data Gd, based on the data relating to the guidance data Gd contained in the differential data file Df that is sorted by the data sorting means 14. More specifically, the referential database updating means 18 obtains at first, based on the comparison table illustrated in FIG. 6, the record mark information of the corresponding data from the permanent ID of the guidance data Gd subject to update contained in the differential data file Df. Then, it extracts the corresponding guidance data Gd from the referential database 19 and updates the referential database 19 by rewriting the data based on the substantive data contained in the differential data file Df.

While the application programs PG1 to PG5 of the navigation program PG are running, the referential database updating means 18 stores in sequence the data converted by the conversion means 17 in the parallel updating area Fr of the referential database 19. When the conversion by the conversion means 17 is completed, the referential database 19 is updated by replacing the data in the referential database 19 with the data stored in the parallel updating area Fr. That is to say, while the application programs PG1 to PG5 in the navigation calculation means 20 are running, the predefined application databases 19a to 19e in the referential database 19 are referenced accordingly by the aforementioned running application programs PG1 to PG5. On the other hand, as the conversion of data formats by the conversion means 17 takes a relatively long time, when the referential database 19 is updated by writing the converted data to the application databases 19a to 19e as being converted by the conversion means 17 while the application programs PG1 to PG5 are running, some troubles might be caused in the operation of the running application programs PG1 to PG5. Therefore, while any one of the application programs PG1 to PG5 is running, the data converted by the conversion means 17 is temporarily stored in the parallel updating area Fr. After the conversion is completed, the referential database 19 is updated by replacing the data in the referential database 19 with the data stored in the parallel updating area Fr. In this way, it makes it possible to run the navigation program PG operating the basic functions of the navigation device 1 such as self-location display, route calculation from a start point to a destination, route guidance, and destination search, and to update the referential database 19 in parallel. The process to replace the data in the referential database 19 with the data stored in the parallel updating area Fr is done, for example, by switching around the addresses of storage areas in the referential database 19 between the data stored in the parallel updating area Fr and the corresponding data subject to update.

The differential data creating server 2 is a server that creates the differential data file Df and provides it to the differential data delivery server 3. In order to implement such processes, the differential data creating server 2 has an input terminal 31 as a means receiving new data, a data category judging means 32, a comparison local database 33, a new local database 34, a new local database generating means 35, and a differential data file generating means 36.

The input terminal 31 is a terminal to receive an entry of new data. The new data entered is the substantive data to be newly added, modified, deleted, and such to the contents of the road network data Rn and the guidance data Gd and such stored in the referential database 19 of the navigation device 1. For example, when a new road is constructed, intersection data, connection data, road data, geometry data, and such included in the road network data Rn relating to the aforementioned road constructed and various image data, audio data, POI data, and such included in the guidance data Gd which become necessary with the construction of the aforementioned new road is entered as new data through the input terminal 31. When a road has been removed, for example, the information that specifies various data included in a portion of the road network data Rn and the guidance data Gd and such that become unnecessary by the removal of the aforementioned road is entered. As for the information to specify such data, for example, the permanent ID and the record mark of each data can be used. As for the input terminal 31, more specifically, a personal computer, for example, with a keyboard, a mouse, a monitor, and such can be used.

The data category judging means 32 judges whether the new data entered through the input terminal 31 is the data relating to road network data Rn or other guidance Gd and such and sort them out. As described later, the comparison local database 33 is a database of road network data Rn having the same content as that of the local database 16 of the navigation device 1, and the new local database 34 is a database of the same road network data Rn having the content of the comparison local database 33 updated with the new data. The data category judging means 32 sends the data relating to road network data Rn sorted out from the new data to the new local database generating means 35. The data category judging means 32 also sends the data relating to guidance data Gd and such other than the road network data Rn to the differential data generating means 36.

The comparison local database 33 is a database having the same content as that of the local database 16 of the navigation device 1. More specifically, the comparison local database 33 stores the road network data Rn in the updating data format as illustrated in FIG. 8, for example, sorted by each predefined block (see block 1 to block 3 illustrated in FIG. 3). The comparison database 33 stores, similar to the local database 16, the comparison table, as illustrated in FIG. 6, for the record marks and the permanent IDs of the data included in the road network data Rn. The content of the comparison local database 33, as updated to match the content of the new local database 34 after the differential data file Df is created, is always maintained as the same as that of the local database 16 of the navigation device 1 which is updated with the differential data file Df. As described later, the new local database 34 stores only the road network data Rn of the block that is updated with the new data. Therefore, updating of the road network data Rn stored in the comparison local database 33 is done only for the road network data Rn of the block stored in the new local database 34. When the comparison local database 33 is updated, version data dg (see FIG. 8) for the road network data Rn of the updated block is updated to the same version as that of the version data db (see FIG. 7) of the created differential data file Df.

The new local database 34 is a database having the content updated with the content of the new data entered through the input terminal 31 in the same data format as that of the comparison local database 33. More specifically, the new local database 34 stores, similar to the comparison local database 33, the road network data Rn in the updating data format, as illustrated in FIG. 8 for example, and the comparison table of the record mark and the permanent ID of each piece of the data included in the road network data Rn, as illustrated in FIG. 6. Here, as described later, the new local database generating means 35 updates the road network data Rn by each predefined block (see block 1 to block 3 illustrated in FIG. 3) and stores them to the new local database 34. Therefore, the new local database 34 stores, as for the road network data Rn, only the data of the updated blocks. As for the content of the comparison table, the portions updated with the content of the new data are different from that of the comparison local database 33.

The new local database generating means 35 generates the new local database 34 based on the comparison local database 33 and the new data entered through the input terminal 31. Specifically, the new local database generating means 35 converts the data relating to road network data Rn entered through the input terminal 31 to be added, modified, deleted and such to the updating data format similar to the data stored in the comparison local database 33. Then the new local database generating means 35 reads out the road network data Rn of the block subject to update from the comparison local database 33 and updates the content of the road network data Rn using the aforementioned converted data by adding, modifying, deleting and so on. Then, it stores the updated road network data Rn of the aforementioned block to the new local database 34. Corresponding to the above, the new local database generating means 35 updates the content of the comparison table (see FIG. 6) by adding, modifying, deleting, and so on, and stores the updated comparison table to the new local database 34.

For example, when a new road is constructed, intersection data, connection data, road data, geometry data, and such included in the road network data Rn relating to the aforementioned road constructed are entered through the input terminal 31. The new local database generating means 35 arranges its data formats to the updating data format and adds the data relating to the new road to the aforementioned road network data Rn by reading out the road network data Rn of the block subject to update from the comparison local database 33, based on the coordinate information of each data and the content of connection data and such. In this case, it also makes necessary changes and such to the relating data included in the existing road network data Rn. Further, the new local database generating means 35 gives a new permanent ID to the newly added data, adding to the comparison table (see FIG. 6) as well. When a road has removed, for example, the information that specifies various data included in a portion of the road network data Rn that become unnecessary by the removal of the aforementioned road is entered through the input terminal 31. The new local database generating means 35 reads out the existing road network data Rn of the block subject to update from the comparison local database 33, deletes the data included in the portion of the road network data Rn that become unnecessary from the existing road network data Rn, and makes necessary changes and such to the relating data. Further, the new local database generating means 35 deletes the permanent ID of the deleted data from the comparison table (see FIG. 6).

The differential data file generating means 36 generates a differential data file Df based on the difference between the comparison local database 33 and the new local database 34. As described above, the comparison local database 33 is a database having the same content as that of the local database 16 of the navigation device 1, and the new local database 34 is a database having the content updated with the content of the new data entered through the input terminal 31 in the same data format as that of the comparison local database 33. Therefore, by comparing the contents of these two databases and extracting their differences, the data relating to road network data Rn included in the content of the differential data file Df can be obtained. The data relating to guidance data Gd and such other than the road network data Rn sorted by the data category judging means 32 is sent to the differential data file generating means 36. The differential data file generating means 36 generates a differential data file Df by combining the data relating to road network data Rn obtained as the difference between the comparison local database 33 and the new local database 34 and the data relating to guidance data Gd and such sent from the data category judging means 32, and by arranging them in the predefined data format of the differential data file Df. In addition, the differential data file Df is created according to the road network data Rn of the updated block stored in the new local database 34 by each predefined block.

As the details of the content of the differential data file Df is described already, its detailed description is omitted here. The differential data file DF, as illustrated in FIG. 7, is so configured that each data group is arranged in the order of data categories sorted by each update status, such as addition, modification, and deletion, following block ID data da and version data db. The block ID data da is the data representing the block of the road network data Rn subject to update with the aforementioned differential data file Df, and is the data representing the block of the road network data Rn based upon which the aforementioned differential data file Df is created. The differential data file generating means 36 counts the number of times a differential data file Df has been created, stores it in a version data storage means (not shown), and gives a sequential number and such as version data db according to the aforementioned number of times created. In addition, the number of times the differential data file Df has been created is counted by the block according to the block of the road network data Rn, and a sequential number and such of each block is used as version data db. The permanent ID linked to each substantive data is given based on the comparison table (see FIG. 6) stored in the new local database 34. The update status data dc representing the update status and the data category ID data dd are given based on the table (not shown) provided in the differential data file generating means 36. The differential data file Df created by the differential data file generating means 36 is sent to the differential data delivery server 3 and stored in a differential database 41.

The differential data delivery server 3 is a server that provides a differential data file Df created by the differential data creating server 2 to the navigation device 1. In order to implement such a process, the differential data delivery server 3 has the differential database 41, a delivery means 42 as a differential data file output means 44, which outputs the differential data file Df for the navigation device 1, and a media creating means 43.

The differential database 41 is a database that stores a differential data file Df created by the differential data creating server 2. In the differential database 41, all the differential data files Df ever created by the differential data creating server 2 are stored. Specifically, the differential database 41 stores one or more versions of the differential data files Df for each block according to the road network data Rn.

The delivery means 42 delivers a differential data file Df to the navigation device 1. The delivery means 42 is configured to deliver a differential data file Df to the navigation device 1 via the radio base station 4 or via the communication network 6 and the updating terminal 5. The media creating means 43 is configured to record the differential data file Df stored in the differential database 41 to a recording medium Me according to instructions and such by an operation means (not shown) of the differential data delivery server 3. The method of providing a differential data file Df by the differential data delivery server 3 is later described in details with reference to a flowchart.

Figure 9:
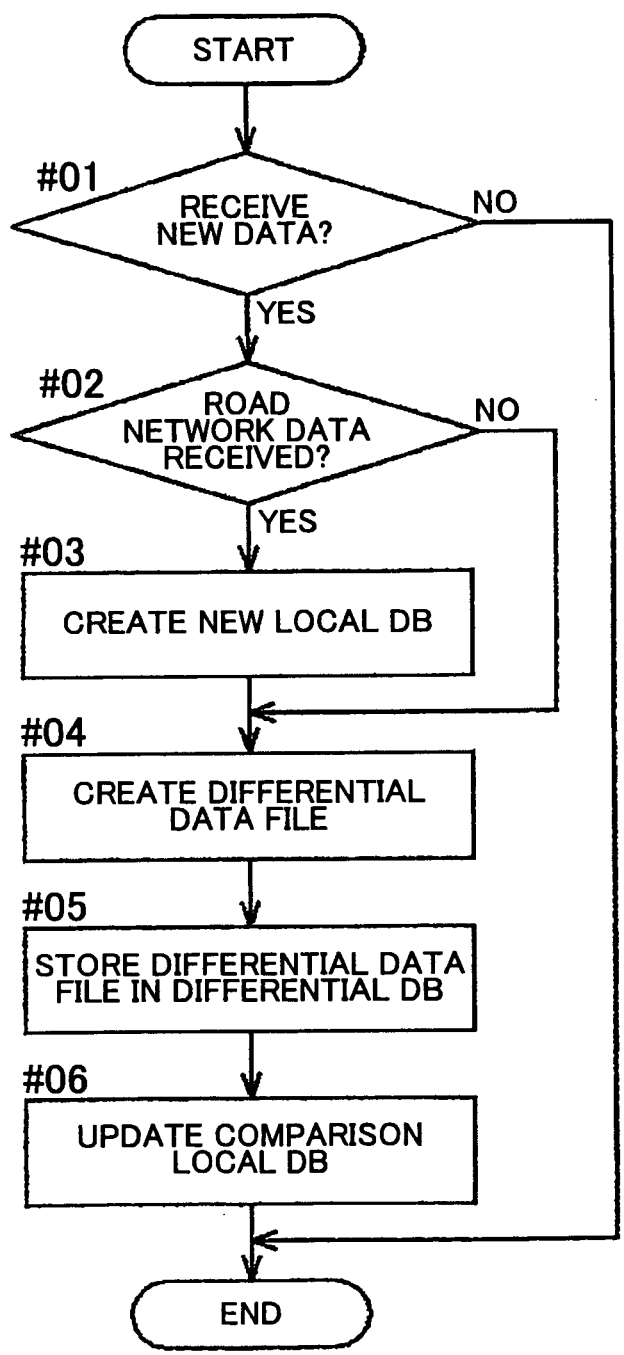
FIG. 9 is a flowchart of creating an exemplary differential data file.

An exemplary method of creating a differential data file Df by the differential data creating server 2 is described with reference to FIG. 9. In the differential data creating server 2, when new data is received through the input terminal 31 (step #01: Yes), the data category judging means 32 judges whether or not the new data relates to road network data Rn (step #02). If the data relates to road network data Rn (step #2: Yes), then the data is sent to the new local database generating means 35, and the new local database generating means 35 generates the new local database 34 (step #03). On the other hand, if the data is guidance data Gd and such, or other data not relating to road network data Rn (step #2: No), then the process does not move on to step #3. If the new data contains both road network data Rn and guidance Gd and such then the data is sorted as follows: data relating to road network data Rn is sent to the new local database generating means 35, and guidance data Gd and such is sent to the differential data file generating means 36.

Then the differential data file generating means 36 generates a differential data file Df based on the difference between the comparison local database 33 and the new local database 34 (step #04). The created differential data file Df is sent to the differential data delivery server 3 and stored in the differential database 41 (step #05). Then, the content of the comparison local database 33 is updated to match the content of the new local database 34 (step #06).

Figure 10:
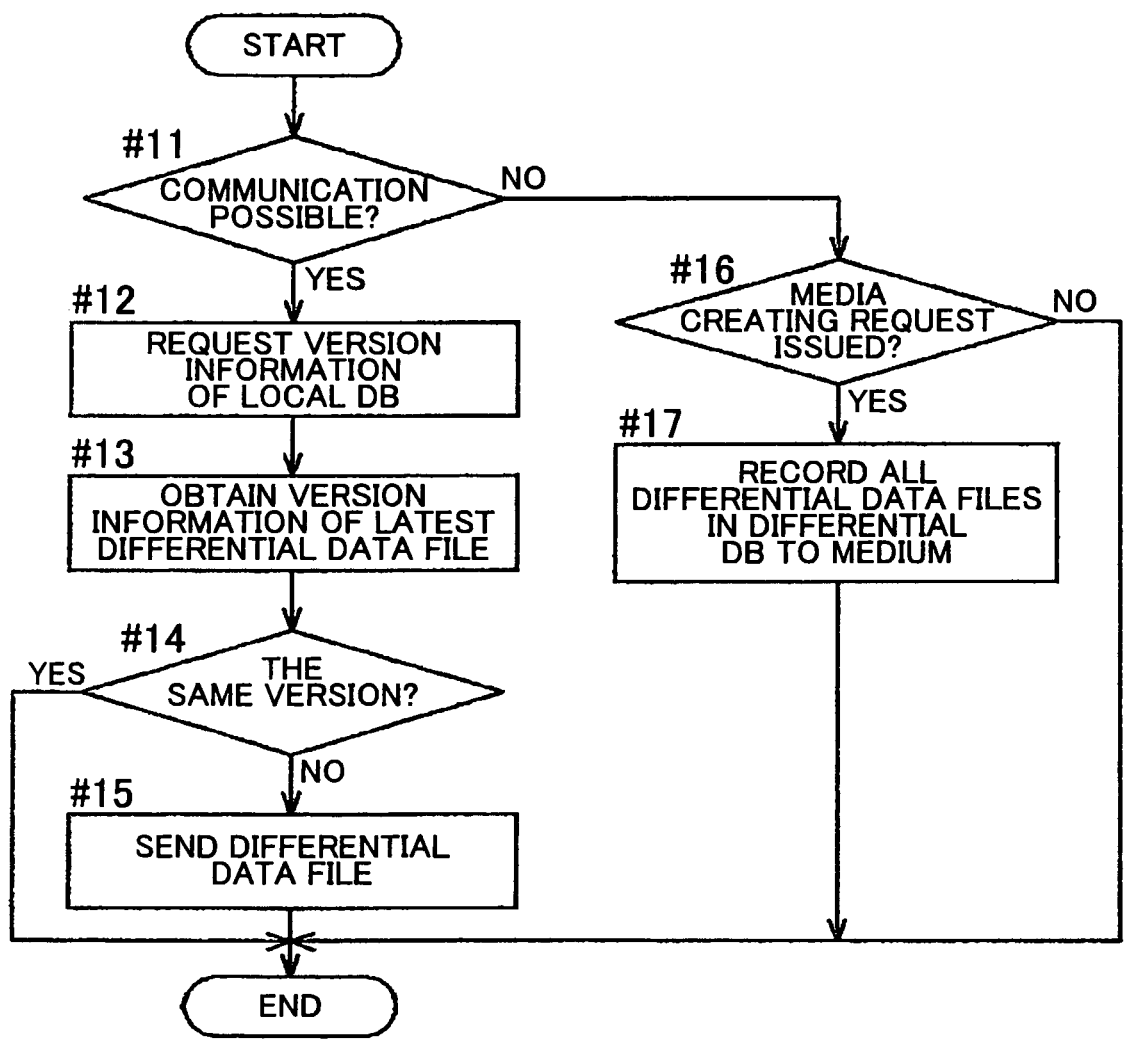
FIG. 10 is a flowchart of providing an exemplary differential data file to a navigation device.

An exemplary method of providing a differential data file Df to the navigation device 1 by the differential data delivery server 3 is described with reference to FIG. 10. In the differential data delivery server 3, the delivery means 42 judges whether or not it is in the state possible to communicate with the navigation device 1 or not (step #11). As previously described, the delivery means 42 communicates with the navigation device 1 via the radio base station 4 or via the communication network 6 and the updating terminal 5. When communication with the navigation device 1 is possible (step #11: Yes), the delivery means 42 requests to the navigation device 1 the version information of the road network data Rn stored in the local database 16 (step #12). In this case, the navigation device 1 reads out each version data dg of the road network data Rn of each block stored in the local database 16, and sends the data to the differential data deliver server 3 as the version information of the road network data Rn of each block.

On the other hand, the delivery means 42 obtains the latest version information of the differential data file Df of each block based on the version data db of each differential data file Df stored in the differential database 41 (step #13). Then, the delivery means 42 compares the latest version information of the differential data file Df of each block obtained in step #13 and the version information of each road network data Rn received from the navigation device 1 and judges whether or not their versions are the same (step #14). Here, the comparison of versions is done with the differential data file Df and the road network data Rn of the same block ID data da and df (see FIGS. 7 and 8) by each block. When the versions are not the same (step #14: No), more specifically, when the latest version of the differential data file Df of the same block is later than the version of the road network data Rn of the navigation device 1, all differential data files Df of later versions than the version of the road network data Rn are sent to the navigation device 1. On the other hand, when the versions are the same (step #14: Yes), more specifically, when the latest version of the differential data file Df of the same block is the same as the version of the road network data Rn of the navigation device 1, as updating with the differential data file Df is not required, the process is finished without sending the differential data file Df.

In the differential data delivery server 3, if the delivery means 42 is not in the state possible to communicate with the navigation device 1 (step #11: No), then it is determined whether or not there is a media creating request from an operation means (not shown) of the differential data delivery server 3 (step #16). When there is a media creating request, all differential data files Df stored in the differential database are recorded to a recording medium Me (step #17). The recording medium Me is then sent, for example, by mail to the user or the provider of the navigation device 1.

Figure 11:
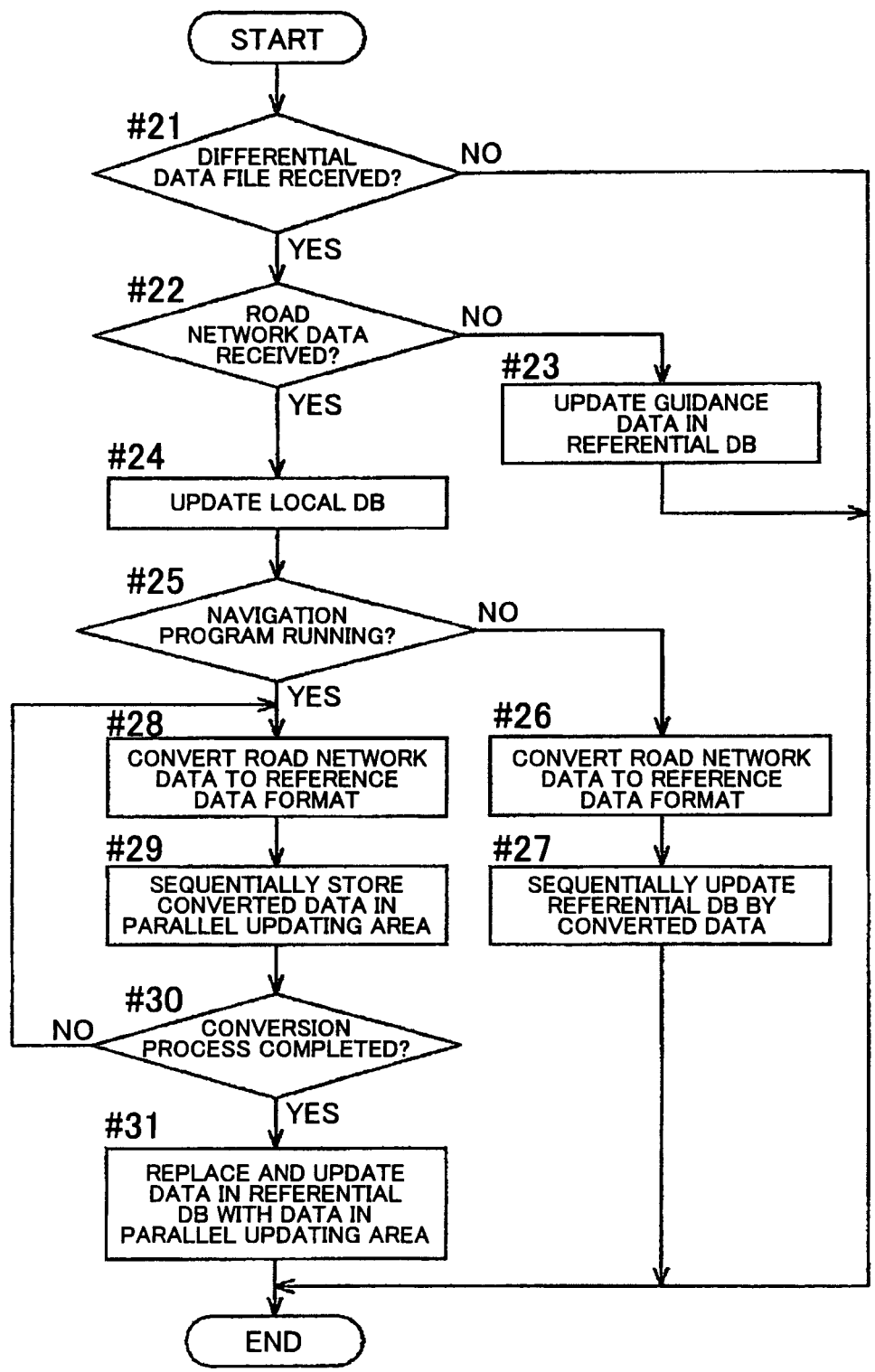
FIG. 11 is a flowchart of updating an exemplary referential database in a navigation device.

An exemplary method of updating the referential database 19 in the navigation device 1 is described with reference to FIG. 11. In the navigation device 1, when the differential data file receiving means 13 receives a differential data file Df (step #21: Yes), the data sorting means 14 sorts out the data relating to road network data Rn and other guidance data Gd and such from the received differential data file Df (step #22). The guidance data Gd, and such or other data not relating to road network data Rn (step #22: No), is sent to the referential database updating means 18, and the referential database updating means 18 directly updates the guidance data Gd and such in the referential database 19 (step #23). On the other hand, the data relating to road network data Rn (step #22: Yes) is sent to the local database updating means 15. There, the local database updating means 15 updates the road network data Rn stored in the local database 16 (step #24).

Then, the navigation device 1 judges whether or not the navigation program PG in the navigation calculation means 20 is running (step #25). If the navigation program is not running (step #25: No), then the conversion means 17 converts the road network data Rn read out from the local database 16 to the road network data Rn in the reference data format corresponding to each of the application programs PG1 to PG5 (step #26). Then, the referential database updating means 18 updates in sequence the content of each of the application databases 19a to 19e in the referential database 19 by the converted road network data Rn (step #27). On the other hand, if the navigation program PG is running (step #25: Yes), then the conversion means 17 converts the road network data Rn read out from the local database 16 to the road network data Rn in the reference data format corresponding to each of the application programs PG1 to PG5 (step #28). Then, the referential database updating means 18 stores in sequence the converted road network data Rn in the parallel updating area Fr of the referential database 19 (step #29). The steps #28 and #29 are repeated until the conversion process of the road network data Rn subject to conversion in step #28 is completed (step #30: No). After the conversion process is completed (step #30: Yes), the referential database 19 is then updated by replacing the data in the referential database 19 with the data stored in the parallel updating area Fr (step #31).

Figure 12:
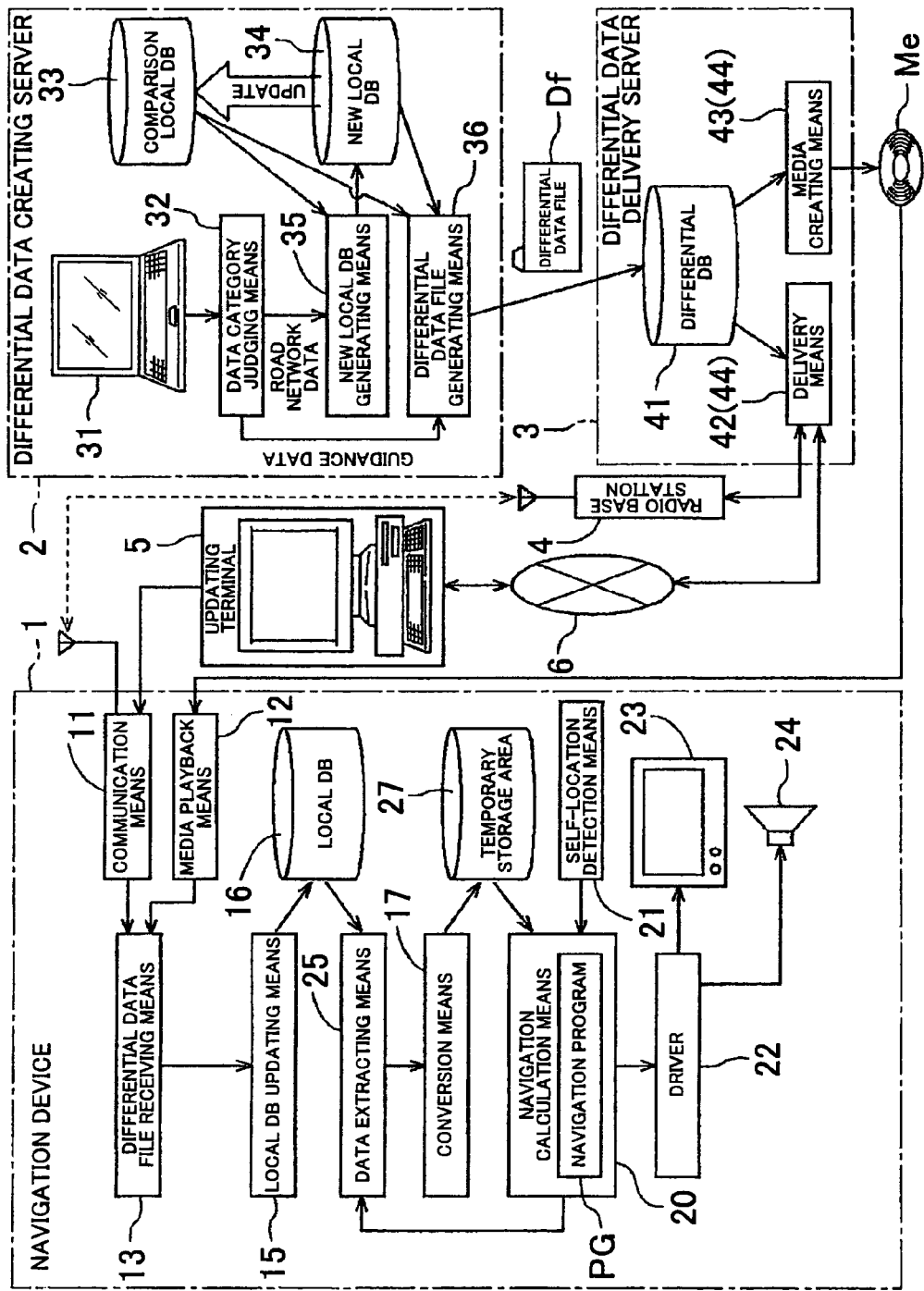
FIG. 12 is a block diagram illustrating a configuration of an exemplary data updating system.

Next, another exemplary data updating system will be described in detail. FIG. 12 is a block diagram illustrating an overall configuration of an exemplary data updating system. The navigation device 1 in this example does not have a referential database 19, but does have a temporary storage area 27. In the navigation device 1, when the navigation program PG is running the navigation calculation means 20, the necessary data is extracted from the local database 16 by an extracting means 25, according to the requests from each of the application programs PG1 to PG5, and converted to the reference data format by the conversion means 17, and stored in the temporary storage area 27. Then the data of the road network data Rn and such in the reference data format temporarily stored in the temporary storage area 27 is referenced by each of the application programs PG1 to PG5. As the referential database 19 is not provided in this example, the guidance data Gd and such other than the road network data is also stored in the local database 16. The navigation device 1 is configured to keep the required capacity of storage means, such as a hard disk drive, small because the referential database 19 is not provided. Meanwhile, the configurations of a differential data creating server 2 and a differential data delivery server 3 are the same as those of the first example. The remaining configurations, unless otherwise described, are the same as those of the previous example.

In this example, the local database 16 stores the data of not only the road network data Rn, but also the other data of guidance data Gd and such. The condition of the stored guidance data Gd is similar to that of the referential database 19 of the first example. Each piece of the data included in the guidance data Gd is linked to the data of links, nodes, and such (see FIG. 4) contained in the road network data Rn. For this reason, as a data sorting means 14 is not provided in the navigation device 1, all the data contained in the differential data file Df received by the differential data file receiving means 13 is sent to the local database updating means 15. The content of the local database 16 is updated by the local database updating means 15 based on the road network data Rn and the guidance data Gd and such contained in the differential data file Df.

In this example, the update of the road network data Rn is similar to that of the previous example. Specifically, the local database updating means 15 updates in blocks the road network data Rn stored in the local database 16 with the differential data file Df of matched block ID data da and df. In this case, the method of update, as described in the previous example, depends on the updating status of the data subject to update contained in the differential data file Df, whether it is of addition, modification, or deletion. When the local database 16 is updated with the differential data file Df, the local database updating means 15 updates the version data dg (see FIG. 8) of the updated block of the road network data Rn in the local database 16 is updated to be the same version as the version data db (see FIG. 7) of the differential data file Df.

In this example, the update of the guidance data Gd in the local database 16 is similar to the update of the guidance data Gd in the referential database 19 of the previous example. Specifically, the local database updating means 15 obtains, based on the comparison table stored in the local database 16 as illustrated in FIG. 6, the record mark information of the corresponding data from the permanent ID of the guidance data Gd subject to update contained in the differential data file Df. Then, it extracts the corresponding guidance data Gd from the local database 16 and updates the local database 16 by rewriting the data based on the actual data contained in the differential data file Df.

The data extracting means 25 extracts necessary data from the local database 16 according to the request of the navigation program PG. In this example, the data extracting means 25 extracts the road network data Rn and its linked guidance data Gd of each predefined block as a minimum unit from the local database 16. Further, the data extracting means 25 extracts the road network data Rn and the guidance data Gd and such of necessary blocks in accordance with the request of each of the plurality of application programs PG1 to PG5.

For example, the display program PG1 requests the data of respective blocks that include the neighboring area of a predefined position of a self-location, a destination, and such as the data necessary for displaying maps and such of the neighboring area of the predefined position. The map matching program PG2 requests the data of respective blocks that include the neighboring area of the self-location as the data necessary for map matching of the self-location. The route calculation program PG3 requests the data of respective blocks that include the neighboring areas of the current position, the destination, and the route from the current position to the destination as the data necessary for setting the route from the current position to the predefined destination. Likewise, the guidance program PG4 and the search program PG5 request the data of respective blocks necessary for calculation of each program. The data extracting means 25 extracts the road network data Rn and the guidance data Gd and such of all respective blocks necessary for each of the application programs PG1 to PG5 from the local database 16 in accordance with the request of each of the application programs PG1 to PG5. Then, the data extracted by the data extracting means 25 is sent to the conversion means 17.

The conversion means 17 converts the road network data Rn and the guidance data Gd and such extracted by the data extracting means 25 to the reference data format corresponding to each of the application programs PG1 to PG5. In this example, the conversion means 17 converts all pieces of data extracted by the data extracting means 25 to the reference data format corresponding to all application programs PG1 to PG5 (5 different reference data formats) regardless of the running status of each of application programs PG1 to PG5. These converted road network data Rn and the guidance data Gd and such in the reference data format are stored in the temporary storage area 27. The data is kept available to be referenced by the navigation program PG until the referencing by the navigation program PG is finished. In addition, when the route setting is changed, the blocks necessary for the route calculating program PG3 and such of the application programs PG1 to PG5 are also changed. Therefore, the road network data Rn and the guidance data Gd and such of the block which is no longer referenced by each of the application programs PG1 to PG5 are erased from the temporary storage area 27. For example, when the power of the navigation device 1 is turned off, the data stored in the temporary storage area 27 is erased as well. Further, when the route setting is changed, the road network data Rn and the guidance data Gd and such of the blocks newly required for each of the application programs PG1 to PG5 are extracted by the data extracting means 25, converted by the conversion means 17 so as to have the reference data format, and stored in the temporary storage area 27.

Figure 13:
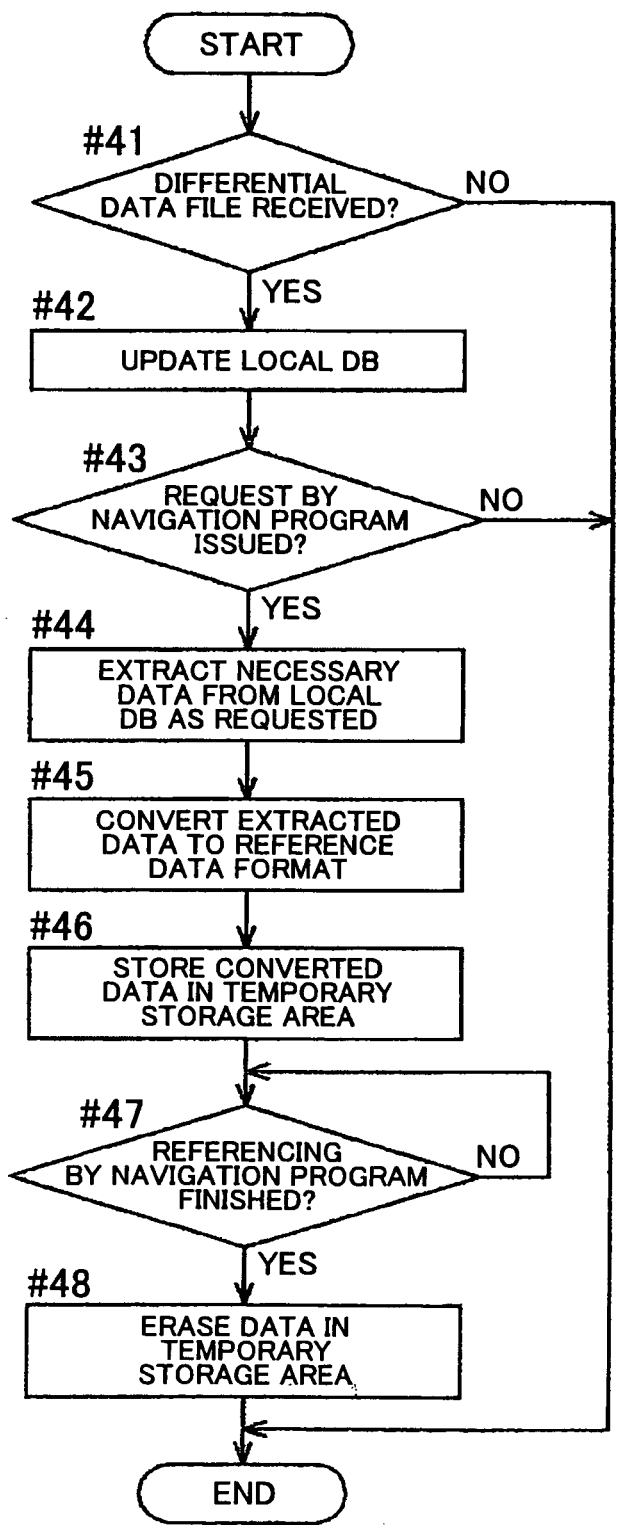
FIG. 13 is a flowchart of an exemplary operation of updating a local database.

An exemplary operation of updating a local database 16 of the navigation device 1 is described with reference to FIG. 13. In the navigation device 1, when the differential data file receiving means 13 receives a differential data file Df (step #41: Yes), the data contained in the differential data file Df is sent to the local database updating means 15, and the local database updating means 15 updates the content of the local database 16 (step #42). Then, when requested by the navigation program PG (step #43: Yes), the data extracting means 25 extracts the necessary data described above from the local database 16, according to the request of each of the application programs PG1 to PG5 of the navigation program PG (step #44). Specifically, the data extracting means 25 extracts the road network data Rn and the guidance data Gd and such of the blocks required in accordance with the request of each of the application programs PG1 to PG5. The conversion means 17 converts the road network data Rn and the guidance data Gd and such extracted by the data extracting means 25 from the updating data format to the reference data format corresponding to each of the application programs PG1 to PG5 (step #45).

The data converted at step #45 is stored in the temporary storage area 27 (step #46). Until the navigation program PG referencing is finished (step #47: No), the converted data remains stored in the temporary storage area 27 and available for reference by the navigation program PG. When the referencing by the navigation program PG is finished (step #47: Yes), the converted road network data Rn and the guidance data Gd and such stored in the temporary storage area 27 are erased (step #48). In this example, the data can be erased by each predefined block. Therefore, when the route setting is changed, it is possible to erase the road network data Rn and the guidance data Gd and such of the block which is no longer referenced by the navigation program PG from the temporary storage area 27, and not to erase the data of the blocks still referenced by the navigation program PG as remained stored in the temporary storage area 27. In addition, when the power of the navigation device 1 is turned off, all the data stored in the temporary storage area 27 is erased.

Figure 14:
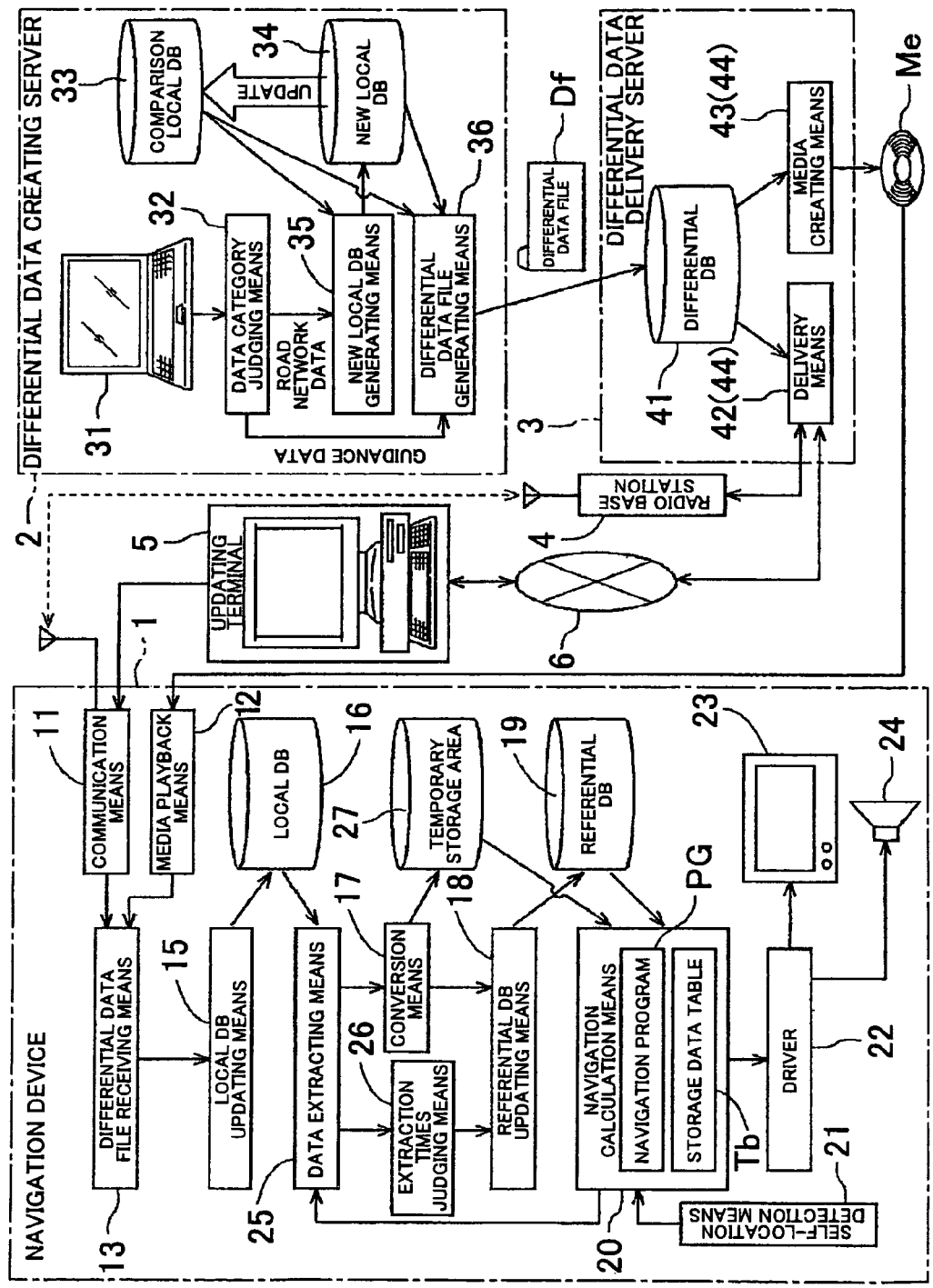
FIG. 14 is a block diagram illustrating an exemplary configuration of a data updating system.

Next, another exemplary data updating system will be described in detail. FIG. 14 is a schematic block diagram illustrating an exemplary configuration of a data updating system. A navigation device 1 in this example is configured quite similar to that of the previous example, however, it has referential database 19, a referential database updating means 18, and an extraction times judging means 26 determining whether the number of times data has been extracted from a local database 16 by a data extracting means 25 meets a predefined condition of extraction times. The navigation device 1 is configured to reduce the load in the conversion process of a conversion means 17 by determining when the number of times data is extracted by the data extracting means 25 meets the predefined condition of extraction times by the extraction times judging means 26, and storing such data in the referential database 19 after it is converted to the reference data format by a conversion means 17. Meanwhile, the configurations and operations of a differential data creating server 2 and a differential data delivery server 3 are the same as those of the previous examples. The remaining configurations, unless otherwise described, are the same as those of the previously described example.

In this example, the navigation device 1 has, in addition to the configurations of the previously described example, a referential database 19, a referential database updating means 18, and an extraction times judging means 26. The extraction times judging means 26 determines whether the number of times for each of the plurality of data stored in the local database 16 extracted by the data extracting means 25 in accordance with the request of the navigation program PG meets the predefined condition of extraction times. In this example, the data extracting means 25 extracts the road network data Rn and its linked guidance data Gd of each predefined block as a minimum unit from the local database 16. The extraction times judging means 26 is configured to determine the number of times extracted for each of the road network data Rn of each predefined block is equal to or higher than a predefined threshold value of N as the predefined condition. Specifically, the extraction times judging means 26 has, though omitted in the drawing, a counting means to count the number of extraction times for the road network data Rn of each predefined block, an extraction times storage means to store the result of counting, and a condition judging means to determine whether the number of times extracted for the road network data Rn of each predefined block stored in the extraction times storage means is equal to or higher than the predefined threshold value of N. It is preferable that the threshold value N be set, for example, to an integer number of about 2 to 5. Consequently, the road network Rn of the blocks which have been extracted a number of times by the data extracting means 25 and frequently referenced by the navigation program PG can be selectively stored in the referential database 19. The extraction times judging means 26 adds one, every time the road network data Rn is extracted by the data extracting means 25, to the extraction times of the road network data Rn of the block extracted. When the result of the extraction times stored in the extraction times storage means is determined to be equal to or higher than the threshold value N by the condition judging means, the predefined condition of extraction times of the road network data Rn and its linked guidance data Gd and such of the block is determined to be met.

The referential database updating means 18 stores the road network data Rn and its linked guidance data Gd and such which have been determined to meet the predefined condition of extraction times by the extraction times judging means 26 to the referential database 19 in the reference data format after converted by the conversion means 17. Therefore, the referential database 19 only stores the data of the road network data Rn and the guidance data Gd and such of the blocks which have been determined that the predefined condition of extraction times is met by the extraction times judging means 26. The referential database 19 also has a plurality of application databases 19a to 19e (see FIG. 3) corresponding to a plurality of application programs PG1 to PG5. The format of data stored in the referential database 19 is of a plurality of reference data formats corresponding to each of the application programs PG1 to PG5.

The navigation calculation means 20 in this example has, in addition to the navigation program PG, a storage data table Tb that is a table representing data stored in the referential database 19. The storage data table Tb contains the list of blocks of the road network data Rn and the guidance data Gd and such stored in the referential database 19. Specifically, it contains the table storing block ID data (see FIG. 5) of each of the blocks. Therefore, the navigation calculation means 20 obtains, by referencing to the storage data table Tb by the navigation program PG, information of data stored in the referential database 19, more specifically, the information of blocks of the road network data Rn and the guidance data Gd and such stored in the referential database 19. The navigation program PG runs referencing to the referential database 19 for the data stored in the referential database 19 and, for other data, similar to those of the previously described example, referencing to the data extracted from the local database 16 and after converted to the reference data format by the conversion means 17.

Exemplary methods of determining extraction times and storing data in the referential database 19, which are specific to the operations of the navigation device 1 in this example, are described with reference to FIG. 15. In the navigation device 1, when the road network data Rn and its guidance data Gd is extracted by the data extracting means 25 (step #51: Yes), the extraction times judging means 26 adds one to the extraction times of the road network data Rn of the block extracted, and stores the extraction times in the extraction times storage means (step #52). Then, the extraction times judging means 26 determines whether or not the extraction times stored in the extraction times storage means is equal to or higher than the predefined threshold value N (step #53). If the extraction times is under the threshold value N (step #53: No), then it is determined that the predefined condition of extraction times is not met (low in extraction times), and the process is finished. On the other hand, if the extraction times is equal to or higher than the threshold value N (step #53: Yes), then it is determined that the predefined condition of extraction times is met (high in extraction times), and the referential database updating means 18 stores the road network data Rn and the guidance data Gd and such to the referential database 19 in the reference data format after being converted by the conversion means 17 (step #54).

Various alternatives, modifications, variations, and/or improvements of the above-described features and/or examples are possible. The following examples are intended to be illustrative of such alternatives, modification, variations, and/or improvements For example, it is possible to make the configurations of the road network data Rn in the reference data format and the updating data format and of the differential data file Df and such different from those in each example above.

In each example, it is possible to erase the content of the comparison local database 33 prior to update. However, it is also possible to configure to store the content along with the version data in the comparison local database 33. In such a configuration, the comparison local database 33 stores multiple versions of the road network data Rn by each predefined block.

In each example, the differential data creating server 2 is configured to create the new local database 34 based on new data and to create the differential data file Df based on the difference between the comparison database 33 and the new local database 34. However, the configuration of the differential data creating server 2 is not limited to such. For example, it is possible to configure the differential data creating server 2 to create the differential data file Df from new data and the comparison database 33, without creating the new local database 34.

In each example, the differential data file Df is created by the differential data creating server 2 based on at least new data and the comparison database 33. However, the configuration of the servers is not limited to such. For example, it is possible to enter the data equivalent to the differential data file Df directly through the input terminal 31 and such, and to store the data in the differential database 41. In such a configuration, the server can be configured to have only a differential data receiving means, in addition to the configuration equivalent to the differential data delivery server 3.

In each example, the servers include the differential data creating server 2 and the differential data delivery server 3. However, the configuration of the servers is not limited to such. For example, it is possible to configure a single server with the functions of the differential data creating server 2 and those of the differential data delivery server 3 combined.

In each example, the navigation program PG as an application program has the application programs PG1 to PG5 and the referential database 19 has the application databases 19a to 19e corresponding to the application programs PG1 to PG5, respectively. However, the application program and the configuration of the referential database 19 are not limited to such. For example, the data stored in the referential database 19 can be configured in the reference data format of one kind and not required to be separated into multiple databases. The application program is not required to have the multiple application programs.

In one example described above, the local database 16 is defined as the database relating to road network data Rn, and the referential database 19 is configured to be updated directly based on the differential data file Df for the guidance data Gd. However, it is possible to configure so that the guidance data Gd and such are stored in the local database 16 as well, and the road network data Rn and guidance data Gd in the local database 16 are updated with the differential data file Df.

(In one example, described above, the data extracting means 25 is configured to extract the road network data Rn and its linked guidance data Gd of each predefined block as a minimum unit from the local database 16. However, the configuration of the data extracting means 25 is not limited to such. For example, it is possible to configure the extracting means 25 to extract the road network data Rn and its linked guidance data Gd and such of each predefined area composed of multiple blocks as a minimum unit, or to extract all the road network data Rn and its linked guidance data Gd and such stored in the local database 16. Also, it can be configured to extract the road network data Rn and its linked guidance data Gd and such of neighboring areas of a set route, regardless of the predefined blocks.

In one example described above, the conversion means 17 is configured to convert all pieces of data extracted by the data extracting means 25 to the reference data format (5 different reference formats) corresponding to all of the application programs PG1 to PG5, regardless of the running status of each of the application programs PG1 to PG5. However, the configuration of the conversion means 17 is not limited to such. For example, it is possible to configure, when the blocks necessary for each of the plurality of application programs PG1 to PG5 differ, the conversion means 17 to convert the data of blocks necessary for each of the application programs PG1 to PG5 to the reference data format corresponding to the application programs PG1 to PG5. Further, it is also possible to configure, when only a part of the plurality of application programs are currently running, the conversion means 17 to convert to the reference data format corresponding only to the running application programs.

In one example described above, the referential database 19 is not provided. However, it is possible to provide a referential database 19 that is not subject to update, in addition to the configurations similar to those in this example. In such a configuration, the navigation program PG can be configured to reference to the referential database 19 for the data not updated with the differential data file Df and to reference to the data extracted from the local database 16 and converted by the conversion means 17 for the data updated with the differential data file Df.

In one example described above, the extraction times judging means 26 counts, when counting the number of extraction times of the road network data Rn of the predefined blocks, the number of extraction times summed regardless of duration. However, the configuration of the extraction times judging means 26 is not limited to such. For example, it is possible to configure the extraction times judging means 26 to count the number of extraction times for a predefined duration. In this case, the extraction times judging means 26 determines whether the predefined condition of extraction times is met by comparing the number of extraction times in the predefined duration with the predefined threshold value N. The predefined duration can be defined, for example, as an operating time of the navigation device 1, the actual time and such. It is also preferable that the extraction times judging means 26 count the number of extraction times in the predefined duration by not counting the extraction times extracted before the predefined duration prior to the present.

In one example described above, the extraction times judging means 26 counts, when counting the number of extraction times of the road network data Rn of the predefined blocks, the number of extraction times regardless of which of the application programs PG1 to PG5 requested the data. However, the configuration of the extraction times judging means 26 is not limited to such. For example, it is possible to configure the extraction times judging means 26 to count the number of extraction times of the road network data Rn of the predefined blocks for each of the application programs PG1 to PG5 requested.

In one example described above, the threshold value N is defined as about 2 to 5 as the predefined condition of extraction times determined by the extraction times judging means 26, as one example. However, the threshold value N is not limited to such. For example, the threshold value N can be defined as 1 or 6 or greater. When the threshold value N is defined as 1, the road network data Rn of the block extracted by the data extracting means 25 even once, more specifically, referenced by the navigation program PG even once, is stored in the referential database 19.

In one example described above, it is preferred to configure to delete the data stored in the referential database 19 that is not referenced by the navigation program PG for longer than a predefined duration from the referential database 19. It is preferable that the predefined duration be defined, for example, by an operating time of the navigation device 1, the moving distance of a self-location and such detected by the self-location detection means 21.

In each example, the terminal device is the navigation device 1 and the data updating system is a map database updating system for navigation. However, the scope of application of the present invention is not limited to such. Therefore, other than updating of the map database used in the navigation device 1 and the like, the present invention can be applied to databases of various categories.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

According to an exemplary aspect of the invention, the navigation device includes the local database in the updating data format suitable for updating with the differential data file and being updated with the differential data file. Accordingly, differential updating can be comparatively easily performed even for a database containing road network data of a large amount, each piece of the data being highly correlated. This structure facilitates frequent data updating with the differential data file, thereby providing the navigation device with timely data continuously. In addition, since the navigation device also includes a navigation controller that converts data stored in the local database so as to have the reference data format to be referenced to by the application program, influence of the local database in the updating data format on the operation of the application program can be reduced. Consequently, the operational performance of the navigation device can be ensured at a level equal to some database in the reference data format. Furthermore, according to the above-mentioned features, while the data format of the local database is a format suitable for updating with the differential data file, the data after conversion means have a format suitable for reference by the application program included in the navigation device. Accordingly, differential updating can be comparatively easily performed for road network data of a large amount, each piece of the data being highly correlated. In addition, influence on the operation of the application program can be reduced, thereby ensuring the operational performance of the navigation device.

According to an exemplary aspect of the invention, the application program runs in principle according to the referential database storing data in the reference data format. Accordingly, there is less processing load on the navigation controller than in a case where the application program allows reading all pieces of data it refers to from the local database conversion. Consequently, the operational performance of the navigation device can be improved.

According to an exemplary aspect of the invention, the content of the referential database is updated according to the content of the local database differentially updated with the differential data file. Consequently, the application program of the navigation device runs based on data updated with the differential data file by simply referring to the referential database.

According to an exemplary aspect of the invention, the conversion of data stored in the local database by the navigation controller and the storage of the converted data are done during the application program's referring to the referential database. It is therefore possible to perform conversion, which is likely to require a comparatively long time, during the operation of the navigation device. In addition, since data stored in the referential database is replaced with the data stored in the parallel updating data storage memory for updating after conversion, the content of the referential database can be updated in a short time.

According to an exemplary aspect of the invention, the server can easily generate, based on the new data entered, the differential data file in accordance with the content of the local database included in the navigation device.

According to an exemplary aspect of the invention, the differential data file is generated based on the database, before and after updated, in the same data format as the local database included in the navigation device. Consequently, the differential data file in a format suitable for updating the local database can be comparatively easily generated.

According to an exemplary aspect of the invention, each of the plurality of application programs to refer to data in a format suitable therefor, while allowing a single data format for the local database to be updated with the differential data file. Therefore, even if the navigation device includes the plurality of application programs, it is unnecessary to transmit a differential data file in format corresponding to each of the application programs, thereby reducing the amount of data contained in the differential data file.

According to an exemplary aspect of the invention, since the actual data to be updated is separated by updating status and then arranged in the order of data types like the updating data format of the local database, differential updating of the local database with the differential data file can be comparatively easily performed.

According to an exemplary aspect of the invention, since the local database can do without guidance data, the amount of data in the local database can be reduced. In this case, since each piece of such guidance data is comparatively less interlinked, it is not particularly difficult to perform direct differential updating of data stored in the referential database.

According to an exemplary aspect of the invention, the navigation device includes the local database in the updating data format suitable for updating with the differential data file and being updated with the differential data file. Accordingly, differential updating can be comparatively easily performed even for a database containing road network data of a large amount, each piece of the data being highly correlated. This structure facilitates frequent data updating with the differential data file, thereby providing timely data continuously. In addition, since the navigation device also includes a navigation controller that converts data stored in the local database so as to have the reference data format to be referenced to by the application program, influence of the local database in the updating data format on the operation of the application program can be reduced. Consequently, the operational performance can be maintained at a level equal to some database in the reference data format. Furthermore, according to the above-mentioned features, while the data format of the local database is a format suitable for updating with the differential data file, the data after conversion can have a format suitable for reference by the application program. Accordingly, differential updating can be comparatively easily performed for road network data of a large amount, each piece of the data being highly correlated. In addition, influence on the operation of the application program can be reduced, thereby ensuring the operational performance of the navigation device.

According to an exemplary aspect of the invention, the server can easily generate, based on the new data entered, the differential data file in accordance with the content of the local database included in the navigation device. Furthermore, according to the above-mentioned features, since actual data to be updated is separated by updating status and then arranged in the order of data types like the updating data format of the local database, differential updating of the local database with the differential data file can be comparatively easily performed.

According to an exemplary aspect of the invention, the local database in the updating data format included in the navigation device is updated with the differential data file output from the server. Accordingly, differential updating can be comparatively easily performed even for a database containing road network data of a large amount, each piece of the data being highly correlated. This structure facilitates frequent data updating with the differential data file, thereby providing the navigation device with timely data continuously. Furthermore, according to the above-mentioned features, the content of the referential database can be updated in accordance with the content of the local database being differentially updated with the differential data file. Accordingly, the application program of the navigation device can run based on the data after updated with the differential data file by simply referencing to the referential database.

According to an exemplary aspect of the invention, the conversion of data stored in the local database so as to have the reference data format and the storage of the converted data are done during the application program's referring to the referential database. It is therefore possible to perform the conversion, which is likely to require a comparatively long time, during the operation of the navigation device. In addition, since data stored in the referential database is replaced with the data stored in the parallel updating data storage memory for updating after the completion of conversion to the reference data format, the content of the referential database can be updated in a short time.

According to an exemplary aspect of the invention, the server can easily generate, based on the new data entered, the differential data file in accordance with the content of the local database included in the navigation device.

According to an exemplary aspect of the invention, the differential data file is generated based on the database, before and after updated, in the same data format as the local database included in the navigation device. Consequently, the differential data file in a format suitable for updating the local database can be comparatively easily generated.

According to an exemplary aspect of the invention, the navigation device includes the local database in the updating data format suitable for updating with the differential data file and being updated with the differential data file. Accordingly, differential updating can be comparatively easily performed even for a database containing a large amount of data, each piece of the data being highly correlated. This structure facilitates frequent data updating with the differential data file, thereby providing the navigation device with timely data continuously. In addition, since necessary data is extracted from the local database in accordance with the request of the application program and converted so as to have the reference data format, the navigation device is not necessarily required to provide a database to store data in the reference data format in advance, thereby reducing the amount of data in the whole of database included in the navigation device. Further, since the navigation device also includes a navigation controller that converts data stored in the local database so as to have the reference data format to be referenced to by the application program, influence of the local database in the updating data format on the operation of the application program can be reduced. Consequently, the operational performance of the navigation device can be maintained at a level equal to some database in the reference data format. Furthermore, according to the above-mentioned features, while the data format of the local database is a format suitable for updating with the differential data file, the data after conversion can have a format suitable for reference by the application program of the navigation device. Accordingly, differential updating can be comparatively easily performed for road network data of a large amount, each piece of the data being highly correlated. In addition, influence on the operation of the application program can be reduced, thereby ensuring the operational performance of the navigation device.

According to an exemplary aspect of the invention, the data which meets a predefined condition of the number of times referenced by the application program is stored in the referential database in the reference data format to be referenced to by the application program. Consequently, the application program runs referencing to the referential database without conversion for such frequently referenced data. Accordingly, there is less processing load on the navigation controller than in a case where the application program allows reading all pieces of data it refers to from the local database and then converting by the navigation controller. Consequently, the operational performance of the navigation device can be improved. Meanwhile, the necessary data which does not meet the predefined condition of the number of times referenced by the application program is extracted from the local database in accordance with the request of the application program and converted so as to have the reference data format, thereby reducing the amount of data in the whole of database included in the navigation device to be comparatively small.

According to an exemplary aspect of the invention, the server can easily generate, based on the new data entered, the differential data file in accordance with the content of the local database included in the navigation device.

According to an exemplary aspect of the invention, the differential data file is generated based on the database, before and after updated, in the same data format as the local database included in the navigation device. Consequently, the differential data file in a format suitable for updating the local database can be comparatively easily generated.

According to an exemplary aspect of the invention, each of the plurality of application programs to refer to data in a format suitable therefor, while allowing a single data format for the local database to be updated with the differential data file. Therefore, even if the navigation device includes the plurality of application programs, it is unnecessary to transmit a differential data file in format corresponding to each of the application programs, thereby reducing the amount of data contained in the differential data file.

According to an exemplary aspect of the invention, the road network data stored in the local database to be extracted and converted in predefined blocks to be referenced to by the application program. Accordingly, the application program included in the navigation device can refer to the data in an appropriate range in accordance with such calculations of guidance and route search.

According to an exemplary aspect of the invention, since actual data to be updated is separated by updating status and then arranged in the order of data types like the updating data format of the local database, differential updating of the local database with the differential data file can be comparatively easily performed.

According to an exemplary aspect of the invention, the navigation device includes the local database in the updating data format suitable for updating with the differential data file and being updated with the differential data file. Accordingly, differential updating can be comparatively easily performed even for a database containing a large amount of data, each piece of the data being highly correlated. This structure facilitates frequent data updating with the differential data file, thereby providing the navigation device with timely data continuously. In addition, since necessary data is extracted from the local database in accordance with the request of the application program and converted so as to have the reference data format, the navigation device is not necessarily required to provide a database to store data in the reference data format in advance, thereby reducing the amount of data in the whole of database included in the navigation device. Further, since the navigation device also includes a navigation controller that converts data stored in the local database so as to have the reference data format to be referenced to by the application program, influence of the local database in the updating data format on the operation of the application program can be reduced. Consequently, the operational performance of the navigation device can be ensured at a level equal to some database in the reference data format. Furthermore, according to the above-mentioned features, while the data format of the local database is a format suitable for updating with the differential data file, the data conversion can have a format suitable for reference by the application program of the navigation device. Accordingly, differential updating can be comparatively easily performed for road network data of a large amount, each piece of the data being highly correlated. In addition, influence on the operation of the application program can be reduced, thereby ensuring the operational performance of the navigation device.

According to an exemplary aspect of the invention, the local database in the updating data format included in the navigation device is updated with the differential data file output from the server. Accordingly, differential updating can be comparatively easily performed even for a database containing a large amount of data, each piece of the data being highly correlated. This structure facilitates frequent data updating with the differential data file, thereby providing the navigation device with timely data continuously. In addition, since necessary data is extracted from the local database in accordance with the request of the application program and converted so as to have the reference data format to be referenced to by the application program, the navigation device is not necessarily required to provide a database to store data in the reference data format in advance, thereby reducing the amount of data in the whole of database included in the navigation device. Further, since the data stored in the local database is converted so as to have the reference data format to be referenced to by the application program, influence of the local database in the updating data format on the operation of the application program can be reduced. Consequently, the operational performance of the navigation device can be ensured at a level equal to some database in the reference data format.

According to an exemplary aspect of the invention, the data which meets a predefined condition of the number of times referenced by the application program is stored in the referential database in the reference data format to be referenced to by the application program. Consequently, the application program runs referencing to the referential database without converting so as to have the reference data format for such frequently referenced data. Accordingly, there is less processing load on the conversion than in a case where the application program allows reading all pieces of data it refers to from the local database and then converting so as to have the referential format. Consequently, the operational performance of the navigation device can be improved. Meanwhile, the necessary data which does not meet the predefined condition of the number of times referenced by the application program is extracted from the local database in accordance with the request of the application program and converted so as to have the reference data format, thereby reducing the amount of data in the whole of database included in the navigation device to be comparatively small.

According to an exemplary aspect of the invention, the server can easily generate, based on the new data entered, the differential data file in accordance with the content of the local database included in the navigation device.

According to an exemplary aspect of the invention, the differential data file is generated based on the database, before and after updated, in the same data format as the local database included in the navigation device. Consequently, the differential data file in a format suitable for updating the local database can be comparatively easily generated.

The invention claimed is:

1. A data updating system comprising:
a server that creates a differential data file for updating a navigation device, the differential data file containing road network data arranged by data types and guidance data that is linked to the road network data; and
the navigation device comprising:
a communication device for communicating with the server to receive the differential data file;
a navigation memory storing:
a local database organized in an updating data format in which the road network data is arranged in an order of the data types and which is updated with the road network data in the differential data file, the local database containing no guidance data; and
a referential database that organizes the road network data and guidance data in a reference data format in which the road network data is arranged in the order of connection of the road network; and
a navigation controller that:
converts data stored in the local database so as to have the reference data format by changing an order of the data from the order of the data types to an order in connection of the road network so that, in the converted data, the road network data is arranged in the order of connection of the road network;
stores the converted data in a temporary storage area; and
updates the road network data in the referential database with the converted data; and
updates the guidance data in the referential database directly based on the differential data file.

2. The data updating system according to claim 1, wherein:
the temporary storage area comprises a parallel updating data storage memory capable of storing data while the navigation controller refers to the referential database, and
the navigation controller sequentially stores converted data in the parallel updating data storage memory during the conversion of the data stored in the local database, and replaces the data stored in the referential database with the data stored in the parallel updating data storage memory so as to update the referential database after the navigation controller completes conversion.

3. The data updating system according to claim 1, wherein the navigation controller updates the local database based on the differential data file.

4. The data updating system according to claim 1, wherein:
the server further comprises a server memory storing a comparison local database having the same content as the local database, and
the server controller receives a new data entry, and generates a differential data file, based on the comparison local database and the new data.

5. The data updating system according to claim 4, wherein the server controller generates, based on the comparison local database and the new data, a new local database in the same data format as the comparison local database and updated with the content of the new data, and generates the differential data file based on a difference between the comparison local database and the new local database.

6. The data updating system according to claim 1, wherein:
the navigation device includes a plurality of application programs, and the navigation controller converts data stored in the local database so as to have the reference data format corresponding to each of the application programs.

7. The data updating system according to claim 1, wherein the differential data file contains data representing an updating status.

8. The data updating system according to claim 1, wherein:
the referential database is a navigation map database containing the road network data with the guidance data linked to the road network data,
the differential data file contains data representing an updating status, road network data for a portion to be updated, and guidance data to be updated.

9. A navigation device for use in a data updating system, the navigation device comprising:
a communication device for receiving a differential data file from a server, the differential data file containing road network data arranged by data types and guidance data that is linked to the road network data;
a navigation memory storing:
a local database organized in an updating data format in which the road network data is arranged in an order of the data types and which is updated with the road network data in the differential data file, the local database containing no guidance data; and
a referential database that organizes the road network data and guidance data in a reference data format in which the road network data is arranged in the order of connection of the road network; and a navigation controller that:
    converts data stored in the local database so as to have the reference data format by changing an order of the data from the order of the data types to an order in connection of the road network so that, in the converted data, the road network data is arranged in the order of connection of the road network;
    stores the converted data in a temporary storage area; and
    updates the road network data in the referential database with the converted data; and
    updates the guidance data in the referential database directly based on the differential data file.

10. The navigation device according to claim 9, wherein:
the temporary storage area comprises a parallel updating data storage memory capable of storing data while the navigation controller refers to the referential database, and
the navigation controller sequentially stores converted data in the parallel updating data storage memory during the conversion of the data stored in the local database, and replaces the data stored in the referential database with the data stored in the parallel updating data storage memory so as to update the referential database after the navigation controller completes conversion.

11. The navigation device according to claim 9, wherein the navigation controller updates at least the local database based on the differential data file.

12. The navigation device according to claim 9, wherein:
the application program includes a plurality of application programs, and
the navigation controller converts data stored in the local database so as to have the reference data format corresponding to each of the application programs.

13. A method for updating data in a navigation device, the method comprising:
    receiving, with a communication device of a navigation device, a differential data file for updating the navigation device, the differential data file containing road network data arranged by data types and guidance data that is linked to the road network data;
    providing a memory in the navigation device storing:
        a local database organized in an updating data format in which the road network data is arranged in an order of the data types and which is updated with the road network data in the differential data file, the local database containing no guidance data; and
        a referential database that organizes the road network data and guidance data in a reference data format in which road network data is arranged in the order of connection of the road network; and
    updating, with a processor in the navigation device, the local database with the differential data file;
    converting, with the processor, data stored in the local database so as to have the reference data format by changing an order of the data from the order of the data types to an order in connection of the road network so that, in the converted data, the road network data is arranged in the order of connection of the road network;
    storing, with the processor, the converted data in a temporary storage area; and
    updating, with the processor, the road network data in the referential database with the converted data; and
    updating, with the processor, the guidance data in the referential database directly based on the differential data.

14. The method for updating data according to claim 13, wherein the temporary storage area comprises a parallel updating data storage memory capable of storing data during reference of the referential database by the processor,
the method further comprising:
    sequentially storing the data converted so as to have the reference data format in the parallel updating data storage memory during conversion of the data stored in the local database, and
    after completion of conversion to the reference data format, replacing data stored in the referential database with the data stored in the parallel updating data storage memory so as to update the referential database.

15. The method for updating data according to claim 13, wherein the server further comprises a server memory storing a comparison local database having the same content as the local database,
the method further comprising:
    receiving a new data entry, and
    generating the road network data in differential data file based on the comparison local database and the new data, and
    generating the guidance data in the differential data file based on the new data.

16. The method for updating data according to claim 15, wherein the server memory further comprises a new local database updated, based on the comparison local database and the new data, with the content of the new data to have the same data format as the comparison local database, and
the method further comprising:
    generating the road network data in the differential data file based on a difference between the comparison local database and the new local database.

* * * * *